United States Patent
Dotzler et al.

(10) Patent No.: US 11,685,298 B2
(45) Date of Patent: Jun. 27, 2023

(54) VEHICLE SEAT WITH SCISSOR FRAME ARRANGEMENT

(71) Applicant: GRAMMER AG, Ursensollen (DE)

(72) Inventors: Florian Dotzler, Hirschau (DE); Konstantin Krivenkov, Amberg (DE)

(73) Assignee: GRAMMER AG, Ursensollen (DE)

( * ) Notice: Subject to any disclaimer, the term of this patent is extended or adjusted under 35 U.S.C. 154(b) by 108 days.

(21) Appl. No.: 17/118,907

(22) Filed: Dec. 11, 2020

(65) Prior Publication Data

US 2021/0178944 A1 Jun. 17, 2021

(30) Foreign Application Priority Data

Dec. 13, 2019 (DE) .......................... 102019134244.9

(51) Int. Cl.
*B60N 2/50* (2006.01)
*B60N 2/52* (2006.01)
*F16M 13/00* (2006.01)

(52) U.S. Cl.
CPC ............. *B60N 2/508* (2013.01); *B60N 2/501* (2013.01); *B60N 2/502* (2013.01); *B60N 2/522* (2013.01); *B60N 2/525* (2013.01); *B60N 2/527* (2013.01); *F16M 13/00* (2013.01)

(58) Field of Classification Search
CPC ........ B60N 2/501; B60N 2/502; B60N 2/508; B60N 2/522; B60N 2/525; B60N 2/527; B60N 2/39; F16M 13/00
See application file for complete search history.

(56) References Cited

U.S. PATENT DOCUMENTS

| | | | |
|---|---|---|---|
| 3,847,338 A | 11/1974 | Adams | |
| 4,095,770 A | 6/1978 | Long | |
| 4,645,169 A | 2/1987 | Mischer | |
| 4,856,763 A | 8/1989 | Brodersen et al. | |

(Continued)

FOREIGN PATENT DOCUMENTS

| | | |
|---|---|---|
| CN | 104742771 | 7/2015 |
| CN | 204999557 | 1/2016 |

(Continued)

OTHER PUBLICATIONS

Extended Search Report for European Patent Application No. 20000449.7, dated May 14, 2021, 9 pages.

(Continued)

*Primary Examiner* — Tan Le
(74) *Attorney, Agent, or Firm* — Sheridan Ross P.C.

(57) ABSTRACT

The invention relates to a vehicle seat comprising a vehicle seat upper part and a vehicle seat lower part, which are spaced apart from one another along a height axis and are connected to one another by means of a scissor frame arrangement, wherein the scissor frame arrangement comprises at least one inner swinging arm and at least one outer swinging arm, wherein the at least one inner swinging arm and the at least one outer swinging arm are mechanically coupled, whereby an angle of inclination of the vehicle seat upper part relative to the vehicle seat lower part can be specified, wherein the mechanical coupling comprises an arm element and a first connecting element pivotably connected thereto, wherein the angle of inclination can be specified by a length of the first connecting element.

10 Claims, 13 Drawing Sheets

(56) References Cited

U.S. PATENT DOCUMENTS

| | | |
|---|---|---|
| 5,169,112 A | 12/1992 | Boyles et al. |
| 5,251,864 A | 10/1993 | Itou |
| 5,388,801 A * | 2/1995 | Edrich .................. B60N 2/508 248/564 |
| 5,735,509 A | 4/1998 | Gryp et al. |
| 5,927,679 A | 7/1999 | Hill |
| 5,954,400 A | 9/1999 | Brodersen |
| 5,957,426 A | 9/1999 | Brodersen |
| 5,975,508 A | 11/1999 | Beard |
| 6,120,082 A | 9/2000 | Vandemolen |
| 6,135,225 A | 10/2000 | Barsic |
| 6,366,190 B1 | 4/2002 | Fujita et al. |
| 6,550,740 B1 | 4/2003 | Burer |
| 6,616,117 B2 | 9/2003 | Gryp et al. |
| 7,000,910 B2 | 2/2006 | Oshimo |
| 7,568,675 B2 | 8/2009 | Catton |
| 7,988,232 B2 | 8/2011 | Weber et al. |
| 8,585,004 B1 | 11/2013 | Roeglin et al. |
| 8,800,976 B2 | 8/2014 | Bethina et al. |
| 9,527,416 B2 | 12/2016 | Brodersen |
| 9,644,378 B2 | 5/2017 | Knox |
| 9,694,727 B2 | 7/2017 | Haller et al. |
| 9,758,078 B2 | 9/2017 | Haller |
| 9,809,136 B2 * | 11/2017 | Haller .................. B60N 2/502 |
| 9,937,832 B2 | 4/2018 | Haller |
| 10,012,286 B2 | 7/2018 | Haller et al. |
| 10,583,753 B2 | 3/2020 | Lorey et al. |
| 10,654,381 B2 * | 5/2020 | Lorey .................. B60N 2/502 |
| 10,926,676 B2 * | 2/2021 | Dotzler .................. B60N 2/502 |
| 2004/0090100 A1 | 5/2004 | Igarashi |
| 2004/0159763 A1* | 8/2004 | Mullinix .................. B60N 2/508 248/421 |
| 2007/0096513 A1 | 5/2007 | Jones et al. |
| 2007/0295882 A1 | 12/2007 | Catton |
| 2009/0134595 A1 | 5/2009 | Haller et al. |
| 2010/0102586 A1 | 4/2010 | Jungert et al. |
| 2010/0140991 A1 | 6/2010 | Hassler et al. |
| 2010/0224343 A1 | 9/2010 | Fukuma et al. |
| 2011/0226930 A1 | 9/2011 | Enns et al. |
| 2011/0284713 A1 | 11/2011 | Ellerich |
| 2012/0097822 A1 | 4/2012 | Hammarskiold |
| 2012/0145875 A1 | 6/2012 | Haller et al. |
| 2013/0140865 A1 | 6/2013 | Shin |
| 2013/0206949 A1* | 8/2013 | Archambault ......... B60N 2/508 248/421 |
| 2013/0306825 A1 | 11/2013 | Brodersen |
| 2014/0091191 A1 | 4/2014 | Romera Carrion |
| 2014/0131542 A1 | 5/2014 | Hodnefield et al. |
| 2014/0316661 A1 | 10/2014 | Parker et al. |
| 2015/0232004 A1 | 8/2015 | Haller et al. |
| 2015/0232005 A1 | 8/2015 | Haller et al. |
| 2016/0200230 A1 | 7/2016 | Haller |
| 2016/0207430 A1 | 7/2016 | Haller |
| 2016/0214658 A1 | 7/2016 | Haller |
| 2019/0009697 A1 | 1/2019 | Lorey et al. |
| 2020/0108751 A1 | 4/2020 | Dotzler et al. |
| 2020/0122612 A1 | 4/2020 | Fillep et al. |

FOREIGN PATENT DOCUMENTS

| | | |
|---|---|---|
| CN | 107310438 | 11/2017 |
| CN | 109435800 | 3/2019 |
| CN | 110497829 | 11/2019 |
| DE | 2309808 | 9/1973 |
| DE | 4238733 | 5/1994 |
| DE | 20101762 | 5/2001 |
| DE | 102009022328 | 6/2010 |
| DE | 102015121764 | 8/2017 |
| DE | 102016120194 | 4/2018 |
| DE | 102016222800 | 5/2018 |
| DE | 102018112004 | 11/2019 |
| DE | 102018124507 | 4/2020 |
| DE | 102018124512 | 4/2020 |
| EP | 1863671 | 1/2012 |
| EP | 2423039 | 2/2012 |
| EP | 2463146 | 6/2012 |
| EP | 3181396 | 6/2017 |
| EP | 3428009 | 1/2019 |
| FR | 912187 | 8/1946 |
| GB | 2009881 | 6/1979 |
| JP | H01-136031 | 9/1989 |
| JP | H03-220031 | 9/1991 |
| WO | WO 2004/074735 | 9/2004 |
| WO | WO 2007/058572 | 5/2007 |
| WO | WO 2009/054788 | 4/2009 |
| WO | WO 2014/176130 | 10/2014 |

OTHER PUBLICATIONS

Extended Search Report for European Patent Application No. 20000446.3, dated May 14, 2021, 8 pages.

Official Action for U.S. Appl. No. 17/118,897, dated Sep. 30, 2021 8 pages.

Notice of Allowance for U.S. Appl. No. 17/118,897, dated Feb. 2, 2022 7 pages.

Corrected Notice of Allowance for U.S. Appl. No. 17/118,897, dated Mar. 2, 2022 4 pages.

Official Action with English Translation for China Patent Application No. 202011465200.6, dated Sep. 5, 2022, 11 pages.

Official Action for German Patent Application No. 102019134238.4, dated Aug. 11, 2020, 6 pages.

Official Action for German Patent Application No. 102019134244.9, dated Aug. 11, 2020, 7 pages.

Official Action with Machine Translation for European Patent Application No. 20000446.3, dated Nov. 23, 2022, 6 pages.

* cited by examiner

Section A - A

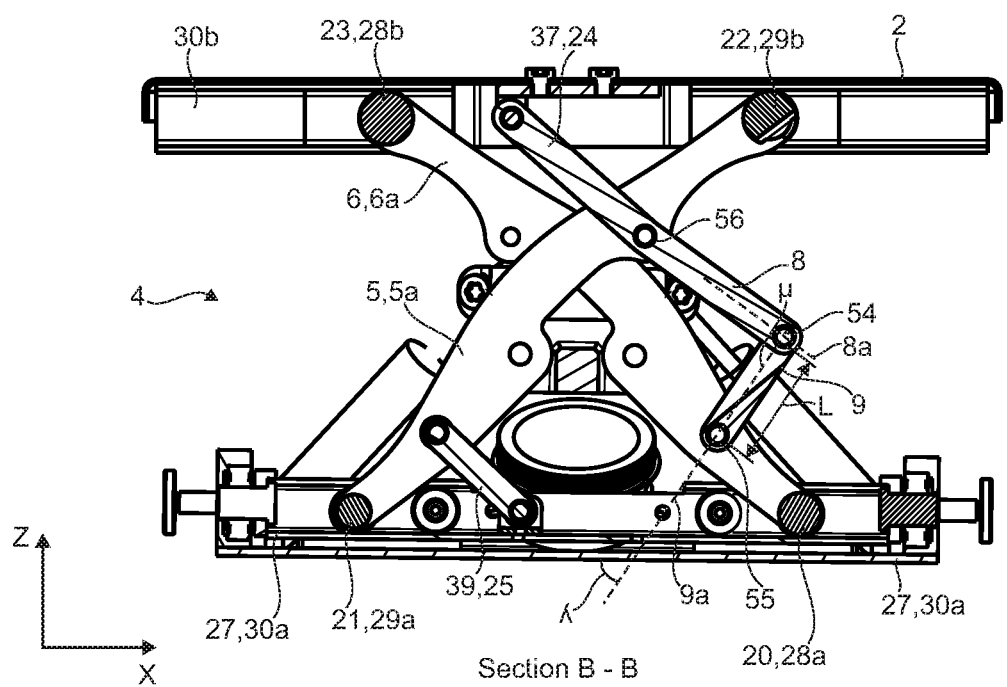
Fig. 8 Section B - B
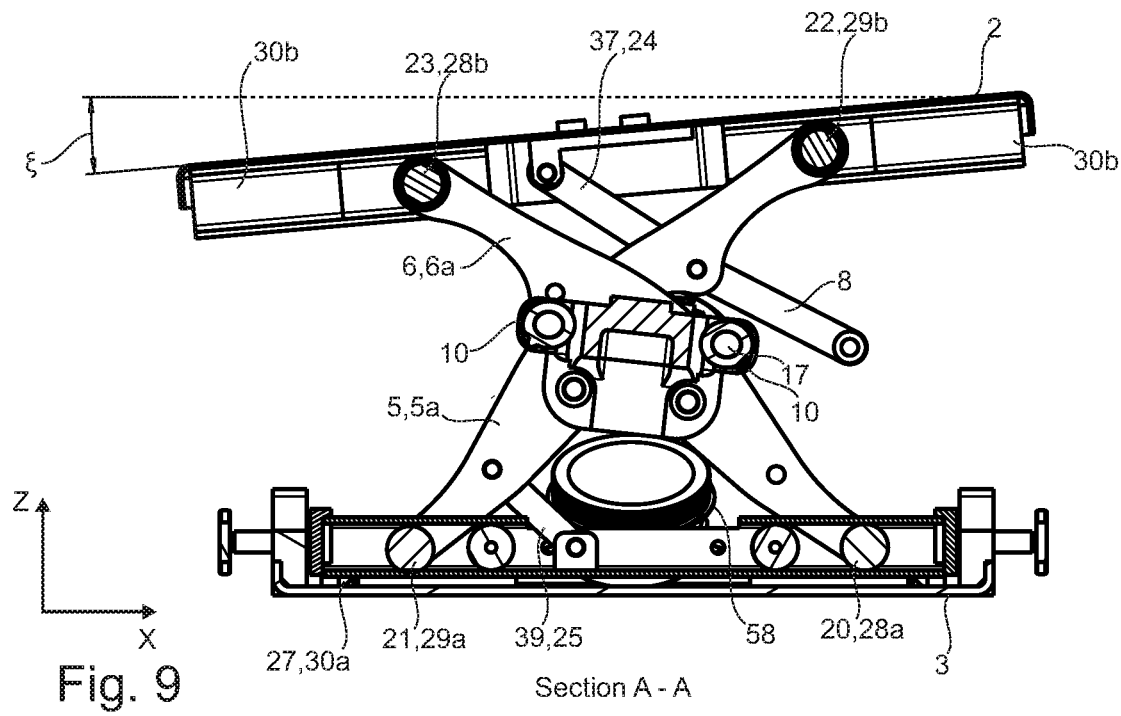
Fig. 9 Section A - A

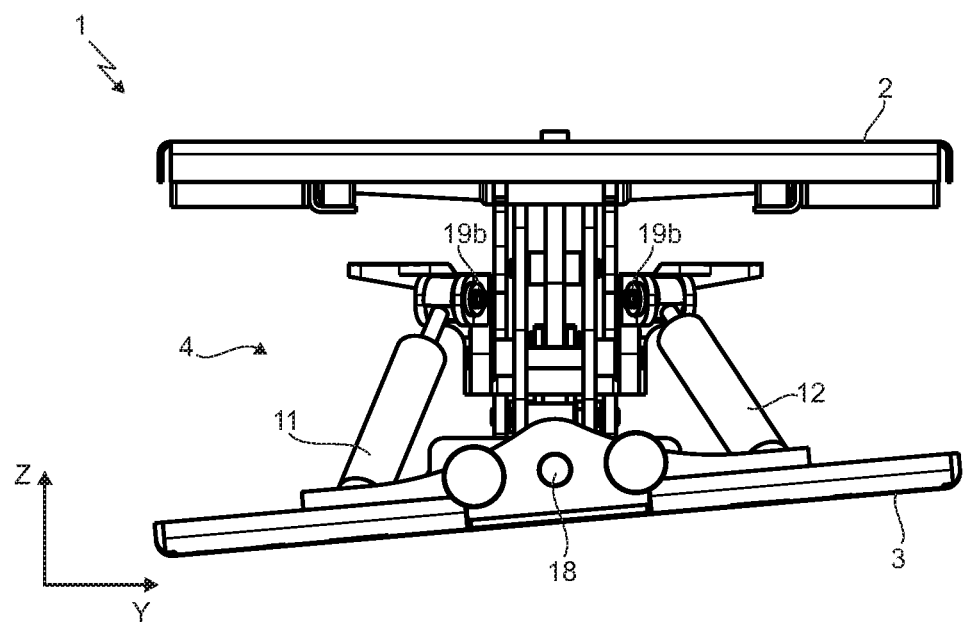
Fig. 14
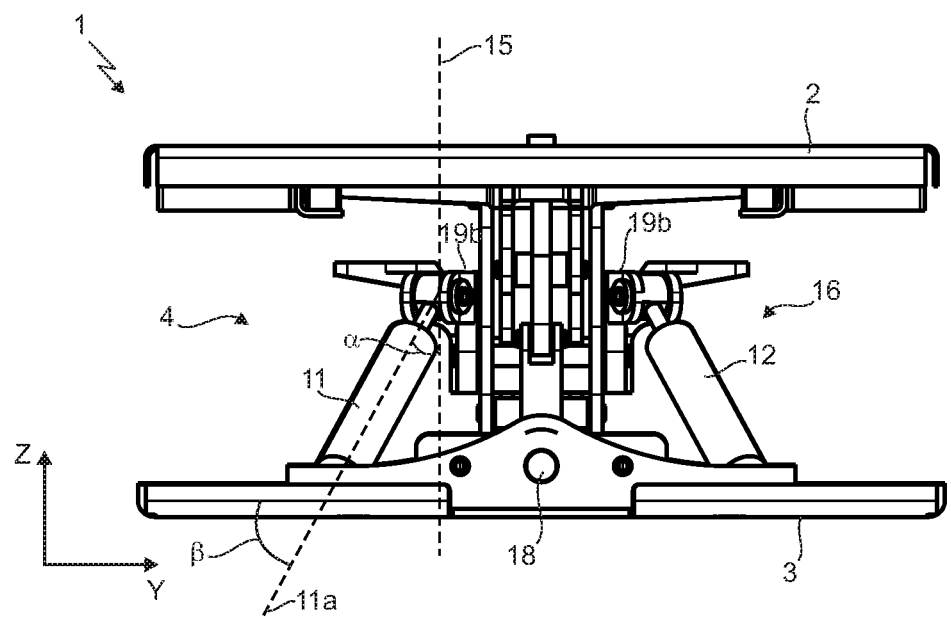
Fig. 15a

VEHICLE SEAT WITH SCISSOR FRAME ARRANGEMENT

CROSS-REFERENCE TO RELATED APPLICATION

This application claims the benefit of German Patent Application No. 102019134244.9 filed Dec. 13, 2019, the entire contents of which are incorporated herein by reference.

FIELD

The invention relates to a vehicle seat comprising a vehicle seat upper part and a vehicle seat lower part, which are spaced apart along a height axis Z and are connected to one another by means of a scissor frame arrangement, wherein the scissor frame arrangement comprises at least one inner swinging arm and at least one outer swinging arm.

BACKGROUND

Vehicle seats of this type are provided in particular in commercial vehicles such as tractors, construction machinery, forklifts, lorries, etc. In particular, driver's seats, in which the vehicle driver spends long periods of time, generally have to meet special conditions. The driver of the vehicle is exposed to physical stress due to the effects of vibrations caused by the state of the route. Such vibration effects should be reduced, among other things, by the driver's seat.

Corresponding vibration loads comprise vertical vibrations of the vehicle seat upper part along the height axis (Z), rotational vibrations due to a rolling movement of the vehicle seat upper part about the longitudinal axis (X), and rotational vibrations due to a pitching movement of the vehicle seat upper part about a width axis (Y).

SUMMARY

The object is achieved by a vehicle seat, comprising a vehicle seat upper part and a vehicle seat lower part, which are spaced apart from one another along a height axis (Z) and are connected to one another by means of a scissor frame arrangement, wherein the scissor frame arrangement comprises at least one inner swinging arm and at least one outer swinging arm, wherein the at least one inner swinging arm and the at least one outer swinging arm are mechanically coupled, whereby an angle of inclination ($\xi$) of the vehicle seat upper part relative to the vehicle seat lower part can be specified, wherein the mechanical coupling comprises an arm element and a first connecting element pivotably connected thereto, wherein the angle of inclination ($\xi$) can be specified by a length (L) of the first connecting element.

The angle of inclination can advantageously be the pitch angle. In the event of a pitching movement, the vehicle seat upper part tilts relative to the vehicle seat lower part about the width axis (Y). Likewise, the vehicle seat upper part can remain aligned horizontally during a pitching movement and the vehicle seat lower part can tilt about the width axis (Y) relative to the vehicle seat upper part. Due to the mechanical coupling according to the invention, the angle of inclination ($\xi$) or the pitch angle can be specified in an extremely simple manner.

The arm element is preferably arranged on the at least one inner swinging arm and the first connecting element is arranged on the at least one outer swinging arm. Alternatively, the arm element can be arranged on the at least one outer swinging arm and the first connecting element can be arranged on the at least one inner swinging arm. The arm element is preferably arranged on the at least one inner swinging arm or the at least one outer swinging arm so as to be rotatable about an axis of rotation. The first connecting element is preferably arranged on the at least one inner swinging arm or the at least one outer swinging arm so as to be rotatable about an axis of rotation.

Furthermore, it would be conceivable for the scissor frame arrangement to comprise a inner swinging arm pair and an outer swinging arm pair. It would also be conceivable that the arm element is arranged on both inner swinging arms or on only one inner swinging arm of the inner swinging arm pair. The arm element can also be arranged on both outer swinging arms or on only one outer swinging arm of the outer swinging arm pair. Similarly, the first connecting element can be arranged on both inner swinging arms or on only one inner swinging arm of the inner swinging arm pair, or on both outer swinging arms or on only one outer swinging arm of the outer swinging arm pair.

The arm element preferably extends along the longitudinal axis (X) and inclined downwards along the height axis (Z). With a horizontal orientation of the vehicle seat upper part, the arm element can preferably extend substantially parallel to a swinging arm. The arm element and the connecting element are preferably arranged in a substantially triangular shape. An angle $\mu$ preferably extends between the arm element and the connecting element, or between their central axes. The angle ($\mu$) is dependent on the angle of inclination ($\xi$). The angle $\mu$ is preferably in a range between 10° and 90°. An angle of attack ($\lambda$) advantageously extends between the connecting element or a central axis of the connecting element and the vehicle seat lower part. If the inclination of the vehicle seat upper part changes, an angle of attack ($\lambda$) changes according to the inclination angle ($\xi$). The angle of attack ($\lambda$) is preferably in a range between 10° and 90°.

According to a preferred embodiment, the at least one inner swinging arm and the at least one outer swinging arm are connected by a second connecting element which can be rotated in each case about a first or a second axis of rotation extending along a width direction (Y) relative to the at least one inner swinging arm and relative to the at least one outer swinging arm. The at least one inner swinging arm and the at least one outer swinging arm preferably intersect in an intersection region. The first axis of rotation and the second axis of rotation are advantageously arranged, at least in a non-use position, along the height axis (Z) above the intersection region or along the height axis (Z) below the intersection region. Advantageously, at least in the non-use position, the connecting element is arranged substantially centrally with respect to a distance between the vehicle seat upper part and the vehicle seat lower part. Accordingly, it is preferred that the at least one inner swinging arm and the at least one outer swinging arm are designed in such a way that, at least in the non-use position, the intersection region is arranged eccentrically with respect to the distance between the vehicle seat upper part and the vehicle seat lower part. The first axis of rotation and the second axis of rotation have preferably a predetermined distance, at least in a non-use position, along the height axis (Z) to the vehicle seat lower part. This predetermined distance can advantageously be the same distance. Therefore, the connecting element would not be pivoted in the non-use position, whereby the two axes of rotation are arranged at the same height. However, it would also be conceivable that the vehicle seat upper part should be tilted relative to the vehicle seat lower part in the non-use position. This can be the case with a specific preferred seat inclination. The first connecting element would therefore advantageously have a corresponding length. The predetermined distance between the first axis of rotation and the second axis of rotation from the vehicle seat lower part would then advantageously result from the specified seat inclination.

According to a preferred embodiment, the vehicle seat upper part is tilted about a pitch axis relative to the vehicle seat lower part during a pitching movement. The second connecting element is preferably rotated about the first axis of rotation and about the second axis of rotation during this pitching movement. Therefore, due to the pivotable connection of the at least one inner swinging arm and the at least one outer swinging arm, a pitching movement of the vehicle seat upper part relative to the vehicle seat lower part can advantageously be translated and/or converted into a rotary movement of the connecting element about a first axis of rotation relative to the at least one inner swinging arm and about a second axis of rotation relative to the at least one outer swinging arm.

According to a further preferred embodiment, the at least one inner swinging arm and the at least one outer swinging arm are each arranged on the vehicle seat lower part by means of at least one lower floating bearing. The at least one inner swinging arm and the at least one outer swinging arm are preferably each arranged on the vehicle seat upper part by means of at least one upper floating bearing. The at least one inner swinging arm or the at least one outer swinging arm are advantageously connected to the vehicle seat lower part by means of a fixed bearing. It is also advantageous in this case that the at least one inner swinging arm or the at least one outer swinging arm are connected to the vehicle seat upper part by means of a further fixed bearing.

According to a further advantageous embodiment, the upper fixed bearing is rigidly connected to the arm element. The upper fixed bearing preferably comprises a second arm element which is rigidly connected to the first arm element of the mechanical coupling. The first and the second arm element could advantageously also be designed in one piece or integrally.

According to an advantageous embodiment, the first connecting element has a fixed length (L). Therefore, the first connecting element can also be referred to as a connecting rod. The connecting rod is advantageously connected to an inner, outer swinging arm so as to be rotatable about an axis of rotation. Furthermore, the connecting rod is connected to the first arm element of the mechanical coupling so as to be rotatable about an axis of rotation. Such a connecting rod can advantageously ensure parallel guidance between the upper suspension part and the lower suspension part. With a constant length (L) of the connecting rod, the angle of inclination (ξ) is advantageously dependent on a seat height or a height of a vertical cushioning/damping.

According to an advantageous embodiment, the length of the first connecting element can be modified. The first connecting element advantageously comprises an actuator by means of which the length (L) can be adjusted. The actuator can advantageously be an electrical actuator, a pneumatic actuator, or a hydraulic actuator. An electrical actuator could for example comprise an electric motor which comprises a screw jack. A control device is also advantageously provided which controls the actuator. A control of the actuator can advantageously comprise an adjustment of the length (L) so that there is no change in the angle of inclination (ξ) when the seat height or the distance between the vehicle seat upper part and the vehicle seat lower part changes. It is thus advantageously possible to keep the inclination of the seat surface constant over a complete height adjustment path by means of the actuator or by means of a connecting rod that can be changed in length. An additional device for adjusting the seat inclination is therefore advantageously not necessary.

According to a further advantageous embodiment, a control device is provided which controls the actuator. At least one sensor is preferably provided which is suitable and intended for detecting pitching vibrations of the vehicle seat upper part and is connected to the control device for signalling purposes. Such a sensor can be, for example, a position sensor, a speed sensor or an acceleration sensor. An active cushioning of pitching vibrations of the vehicle seat upper part advantageously takes place by controlling the actuator. The control device advantageously controls the actuator on the basis of the sensor data. Advantageously, the angle of inclination can be actively adapted depending on the driving situation and the vibration deflection. An almost ideal pitching vibration isolation is therefore made possible.

According to a further advantageous embodiment, the first connecting element comprises a spring element or spring/damper element. The spring element or spring/damper element preferably allows for passive, semi-active or adaptive cushioning/damping of pitching vibrations of the vehicle seat upper part. A spring element is advantageously provided to bring about a resetting of the vehicle upper part to an initial position. A damper is provided to dissipate the kinetic energy. If a damping system, as will be described below, is already provided, which is suitable and intended to dampen pitching vibrations of the vehicle seat upper part, it is advantageous to provide only one spring element. A combined spring/damper element is advantageous if no further damping system is provided for pitching vibrations. It is of course also conceivable that a spring/damper element and another damping system are provided. In the case of semi-active cushioning/damping, a control device is again provided that controls the spring/damper element. The properties of the spring/damper element, for example the damper hardness, can advantageously be set by the control device. The occupant can advantageously select specific cushioning/damping parameters by means of an operating device which is connected to the control device for signalling purposes.

According to a further preferred embodiment, the at least one inner swinging arm and the at least one outer swinging arm are preferably arranged so as to be pivotable relative to the vehicle seat lower part about a third axis of rotation extending along a longitudinal direction. The at least one inner swinging arm, the at least one outer swinging arm and the vehicle seat upper part are advantageously pivoted about the third axis of rotation relative to the vehicle seat lower part during a rolling movement.

According to a further preferred embodiment, at least two damping elements are arranged between the vehicle seat upper part and a vehicle seat lower part, said damping elements each extending, inclined at an angle of attack (α), relative to a first axis parallel to the height axis (Z). With such an inclined arrangement of the at least two damping elements, the angle of attack (α) is advantageously less than 90°. Therefore, at least one vertical movement of the vehicle seat upper part relative to the vehicle seat lower part is dampened by the at least two damping elements. The kinetic energy is advantageously dissipated during a damping process.

According to a particularly preferred embodiment, four damping elements are arranged between the vehicle seat lower part and the connecting element. In a non-use position of the seat, two damping elements in each case preferably form the legs of an imaginary trapezoid. The base sides of the imaginary trapezoid are preferably formed by the vehicle seat lower part and by the connecting element. A non-use position of the vehicle seat is to be understood as that position in which no vibrations are introduced, for example an unoccupied vehicle seat in a stationary vehicle. The vehicle seat lower part is advantageously designed to be substantially rectangular. The four damping elements preferably form an imaginary trapezoid along each side of the vehicle seat lower part. The arrangement of the four damping elements in the non-use position can advantageously also be viewed as an imaginary truncated pyramid. A corresponding imaginary rectangular lower base area would then be given by the four lower arrangement points of the damping elements. An advantageous upper imaginary base area would be provided by upper points of arrangement of the damping elements on the second connecting element.

Due to the pivotable connection of the at least one inner swinging arm and the at least one outer swinging arm, a pitching movement of the vehicle seat upper part relative to the vehicle seat lower part can advantageously be translated and/or converted into a rotary movement of the connecting element about a first axis of rotation relative to the at least one inner swinging arm and about a second axis of rotation relative to the at least one outer swinging arm. Due to the at least two damping elements which are arranged so as to be inclined, the rotational movement of the second connecting element and thus, due to the existing further mechanical coupling, also the corresponding pitching movement of the vehicle seat upper part can be dampened relative to the vehicle seat lower part. A pitching movement is to be understood as a tilting of the vehicle seat upper part relative to the vehicle seat lower part about a pitch axis which extends along the width axis Y. Likewise, the vehicle seat upper part can remain aligned horizontally during a pitching movement and the vehicle seat lower part can tilt about the width axis (Y) relative to the vehicle seat upper part. To dampen a pitching movement, it would be conceivable to provide the at least two damping elements parallel to the height axis (Z), but this would have a detrimental effect on the suspension stroke along the height axis (Z). This disadvantage is advantageously eliminated by the damping elements which are arranged so as to be inclined.

In the event of a rolling movement, the vehicle seat upper part pivots relative to the vehicle seat lower part or vice versa about the third axis of rotation. Such a pivoting modifies a lateral distance between the vehicle seat upper part and the vehicle seat lower part, or between the connecting element and the vehicle seat lower part. Due to the inclined arrangement of the damping elements between the vehicle seat lower part and the connecting element, such a rolling movement can also be dampened. To dampen a rolling movement, it would be conceivable to provide the at least two damping elements parallel to the height axis (Z), but this would have a detrimental effect on the suspension stroke along the height axis (Z). This disadvantage is advantageously eliminated by the damping elements which are arranged so as to be inclined.

Finally, vertical vibrations can be dampened by the damping elements, during which vibrations the vehicle seat upper part is displaced relative to the vehicle seat lower part.

The vehicle seat can preferably also be installed so as to be pivoted by 90° about the Z axis. The pitching movement or the pitch axis would thus become the rolling movement or the roll axis and vice versa.

According to a further advantageous embodiment, the damping elements are arranged on the vehicle seat lower part so as to be pivotable about a respective pivot axis. The damping elements are preferably arranged on the connecting element so as to be pivotable about a respective further pivot axis. The above-mentioned advantageous lower arrangement points on the vehicle seat lower part can therefore preferably be designed as rotary bearing elements, on which the respective damping element is arranged so as to be pivotable. Furthermore, the above-mentioned upper arrangement points on the connecting element can preferably be designed as rotary bearing elements, on which the respective damping element is arranged so as to be pivotable. The respective damping element is advantageously connected to the vehicle seat lower part and/or the connecting element by means of a spherical bearing. The respective damper element advantageously has an upper and a lower damper eye, which is preferably designed as a bore or recess. A corresponding pivot bolt can advantageously be arranged in each of these damper eyes, by means of which the respective damping element is connected to the connecting element and/or the vehicle seat lower part. Furthermore, it is advantageous that a sleeve or bushing made of a resilient material, in which the respective pivot bolt is arranged, is provided in one or more of said damper eyes. Such an advantageous (spherical) bearing allows freedom of rotation due to a resilient deformation of the sleeve or bushing, which is advantageous for example if the two pivot axes at the upper and lower end of the damping element are no longer parallel when rotating about the longitudinal axis (X).

According to a further preferred embodiment, during a vertical movement of the vehicle seat upper part relative to the vehicle seat lower part, the connecting element is displaced along the height axis (Z). The angle of attack ($\alpha$) of the damping elements is preferably dependent on a vertical position of the vehicle seat upper part relative to the vehicle seat lower part. Due to the advantageous pivotable arrangement of the damping elements on the connecting element and/or the vehicle seat lower part, during a displacement of the vehicle seat upper part or the connecting element in the vertical direction, i.e. along the height axis (Z), the angle of attack ($\alpha$) is changed. The angle of attack ($\alpha$) advantageously extends between a central axis of the respective damping element and the first axis. It is advantageous that the angle of attack ($\alpha$) can be different for each damping element. The angle of attack ($\alpha$) is advantageously selected from a range between 10° and 80°. The angle of attack ($\alpha$) is preferably selected from a range between 15° and 75°. The angle of attack ($\alpha$) is more preferably selected from a range between 20° and 70°.

According to a further preferred embodiment, the vehicle seat upper part is tilted about a pitch axis relative to the vehicle seat lower part during a pitching movement. In this case, a rear portion of the vehicle seat upper part can advantageously be tilted upwards or downwards relative to a front portion of the vehicle seat upper part along the height axis (Z). The connecting element is advantageously rotated about the first axis of rotation and about the second axis of rotation during this pitching movement. A displacement of the swinging arm ends mounted in the floating bearings preferably takes place on different horizontal planes along the height axis (Z).

According to a further preferred embodiment, the at least one inner swinging arm, the at least one outer swinging arm and the vehicle seat upper part are pivoted about the third axis of rotation relative to the vehicle seat lower part during a rolling movement.

Advantageously, the damping elements dampen the vertical movement of the vehicle seat upper part relative to the vehicle seat lower part, the pitching movement of the vehicle seat upper part about the pitch axis relative to the vehicle seat lower part, and the rolling movement of the vehicle seat upper part about the third axis of rotation relative to the vehicle seat lower part. The damper forces are advantageously divided into the respective components (roll, pitch or vertical) depending on the angle of attack α.

According to a further preferred embodiment, the lower floating bearings of the at least one inner swinging arm and the at least one outer swinging arm comprise at least one receiving element. The at least one receiving element is advantageously pivotable about the third axis of rotation relative to the vehicle seat lower part. The lower floating bearings preferably comprise bearing rollers. The at least one receiving element is preferably formed as a guide element, in which bearing rollers are guided along the longitudinal direction X.

According to a further preferred embodiment, the scissor frame arrangement comprises two inner swinging arms which form an inner swinging arm pair. The scissor frame arrangement preferably further comprises two outer swinging arms which form an outer swinging arm pair. The two inner swinging arms advantageously have swinging arm ends which are connected by means of a swinging arm bolt. The bearing rollers are preferably arranged on the swinging arm bolt. The two outer swinging arms advantageously have swinging arm ends which are connected by means of a swinging arm bolt. The bearing rollers are preferably arranged on the swinging arm bolt.

According to a further preferred embodiment, at least one spring element is provided in addition to the damper elements, by means of which a displacement of the vehicle seat upper part relative to the vehicle seat lower part due to the vibration effect can be reset by a vertical movement, a pitching movement, or a rolling movement.

BRIEF DESCRIPTION OF THE DRAWINGS

Further advantages, aims and characteristics of the present invention are explained with reference to the following description of the attached drawings. Similar components may have the same reference signs in the various embodiments.

In the drawings:

FIG. 8 is a sectional view along the axis B-B in FIG. 6;

FIG. 9 is a sectional view along the axis A-A in accordance with a further embodiment;

FIG. 14 is a front view of the vehicle seat in accordance with one embodiment after a rolling movement;

FIG. 15a is a front view of the vehicle seat in accordance with one embodiment in a central position along the height axis Z;

DETAILED DESCRIPTION

Figure 1:
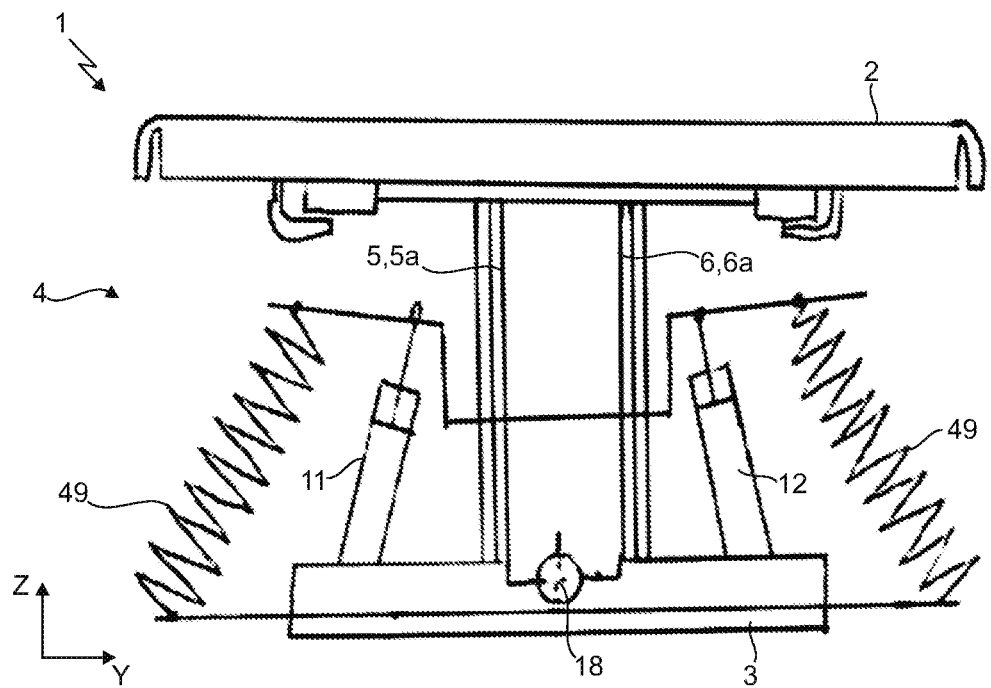
FIG. 1 is an outline sketch of the vehicle seat in accordance with one embodiment.

In FIGS. 1 to 19, a vehicle seat 1 is shown comprising a vehicle seat upper part 2 and a vehicle seat lower part 3, which are spaced apart from one another along a height axis Z and are connected to one another by means of a scissor frame arrangement 4, wherein the scissor frame arrangement 4 comprises at least one inner swinging arm 5, 5a and at least one outer swinging arm 6, 6a, wherein the at least one inner swinging arm 5, 5a and the at least one outer swinging arm 6, 6a are mechanically coupled, whereby an angle of inclination ξ of the vehicle seat upper part 2 relative to the vehicle seat lower part 3 can be specified, wherein the mechanical coupling 7 comprises an arm element 8 and a first connecting element 9 pivotably connected thereto, wherein the angle of inclination ξ can be specified by a length L of the first connecting element 9.

Therefore, the vehicle seat 1 extends along the height axis Z, the width axis Y and the longitudinal axis X. The vehicle seat comprises other elements such as a seat cushion 35 and a backrest 36, which can be arranged on the vehicle seat upper part 2. This can be seen in FIGS. 2a and 2b. Merely for reasons of clarity, the mechanical coupling 7 was not shown in FIGS. 2a and 2b. In the remaining drawings, these elements are not shown for reasons of clarity. Further embodiments are also conceivable which comprise further elements, such as armrests. The vehicle seat lower part 3 can be arranged on a vehicle body.

The arm element 8 extends along the longitudinal axis X from the centre of the vehicle seat 1. Furthermore, it extends inclined downwards along the height axis Z, i.e. towards the vehicle seat lower part 3. The first connecting element 9 extends upwards along the height axis Z, i.e. towards the vehicle seat upper part 2. Therefore, the arm element 8 and the connecting element 9 are arranged in a substantially triangular shape. In the case of a horizontal orientation of the vehicle seat upper part 2, the arm element 8 preferably has a greater length than the connecting element 9 (length L).

The at least one inner swinging arm 5, 5*a* and the at least one outer swinging arm 6, 6*a* are connected by a second connecting element 10 which can be rotated about a first axis of rotation 16 or a second axis of rotation 17 extending along a width direction Y relative to the at least one inner swinging arm 5, 5*a* and relative to the at least one outer swinging arm 6, 6*a*. The at least one inner swinging arm 5, 5*a* and the at least one outer swinging arm 6, 6*a* are arranged so as to be pivotable relative to the vehicle seat lower part 3 about a third axis of rotation 18 extending along a longitudinal direction X.

The at least one inner swinging arm 5, 5*a* and the at least one outer swinging arm 6, 6*a* intersect in an intersection region K. At least in a non-use position, the first axis of rotation 16 and the second axis of rotation 17 are arranged along the height axis Z above the intersection region K or along the height axis Z below the intersection region K. Furthermore, the first axis of rotation 16 and the second axis of rotation 17 are, at least in a non-use position, at the same distance along the height axis Z from the vehicle seat lower part 3. Therefore, the second connecting element 10 is not rotated and is aligned so as to be substantially horizontal and/or parallel to the longitudinal axis X. A central axis M can also be defined, which runs through the intersection point K. This is clearly visible in FIGS. 2*a* and 2*b*. The first axis of rotation 16 and the second axis of rotation 17 are, at least in a non-use position, at the same horizontal distance from the central axis M. The second connecting element 10 is arranged by means of further connecting elements 42 on the at least one inner swinging arm 5 or the at least one outer swinging arm 6. The further connecting elements 42 are suitable for producing a rotatable connection between the second connecting element 10 and the at least one inner swinging arm 5 or the at least one outer swinging arm 6. The further connecting elements 42 extend along the first axis of rotation 16 and/or the second axis of rotation 17 and can be designed as bolts or screws. For this purpose, there are corresponding central bearing bores 41 provided in the at least one inner swinging arm 5 and/or the at least one outer swinging arm 6, in which these further connecting elements 42 are received.

The at least one inner swinging arm 5, 5*a* and the at least one outer swinging arm 6, 6*a* are arranged on the vehicle seat lower part 3 by means of at least one lower floating bearing 20, 21. Furthermore, the at least one inner swinging arm 5, 5*a* and the at least one outer swinging arm 6, 6*a* are each arranged on the vehicle seat upper part 2 by means of at least one upper floating bearing 22, 23.

Figure 3:
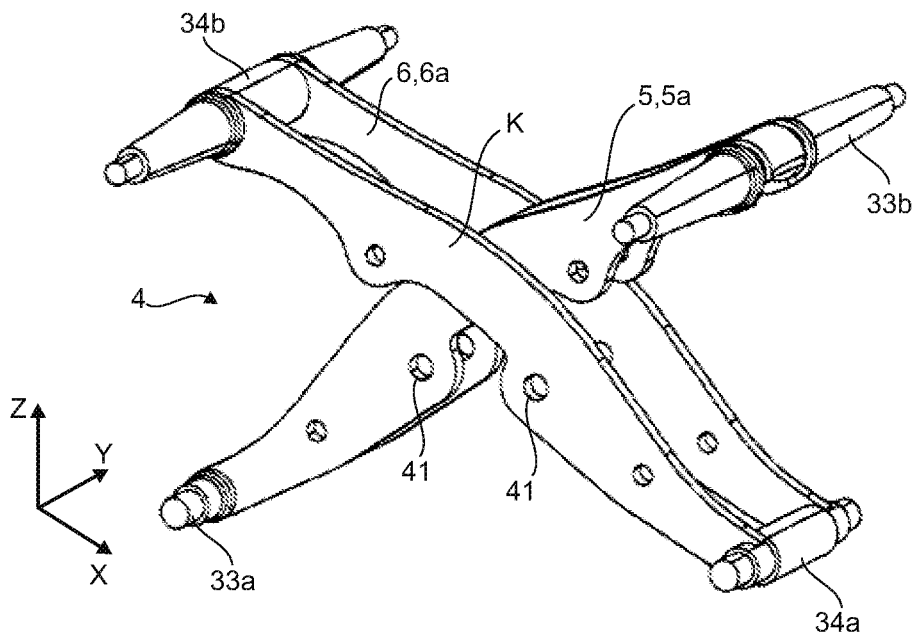
FIG. 3 is a view of the inner swinging arm pair and the outer swinging arm pair.
Figure 4A:
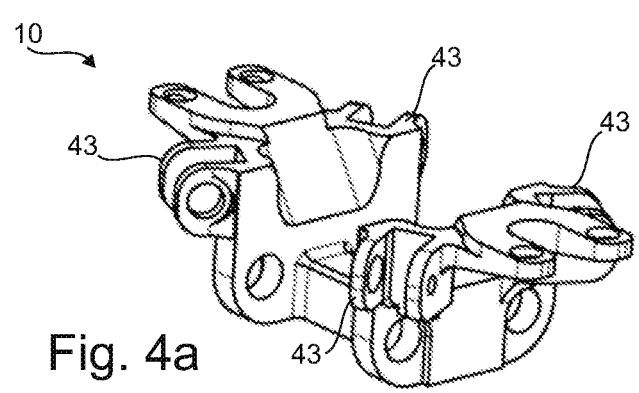
FIG. 4a, 4b are views of the connecting element.
Figure 4B:
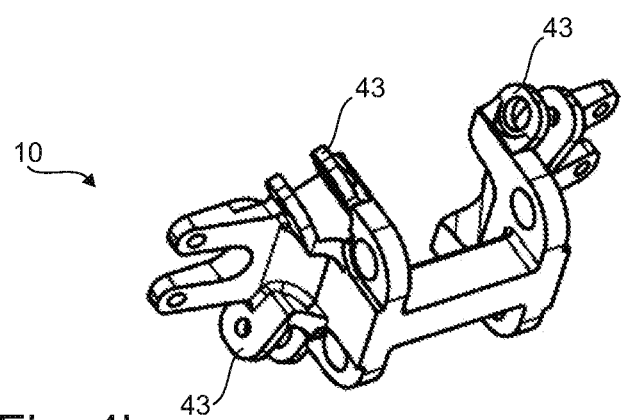
Figure 5:
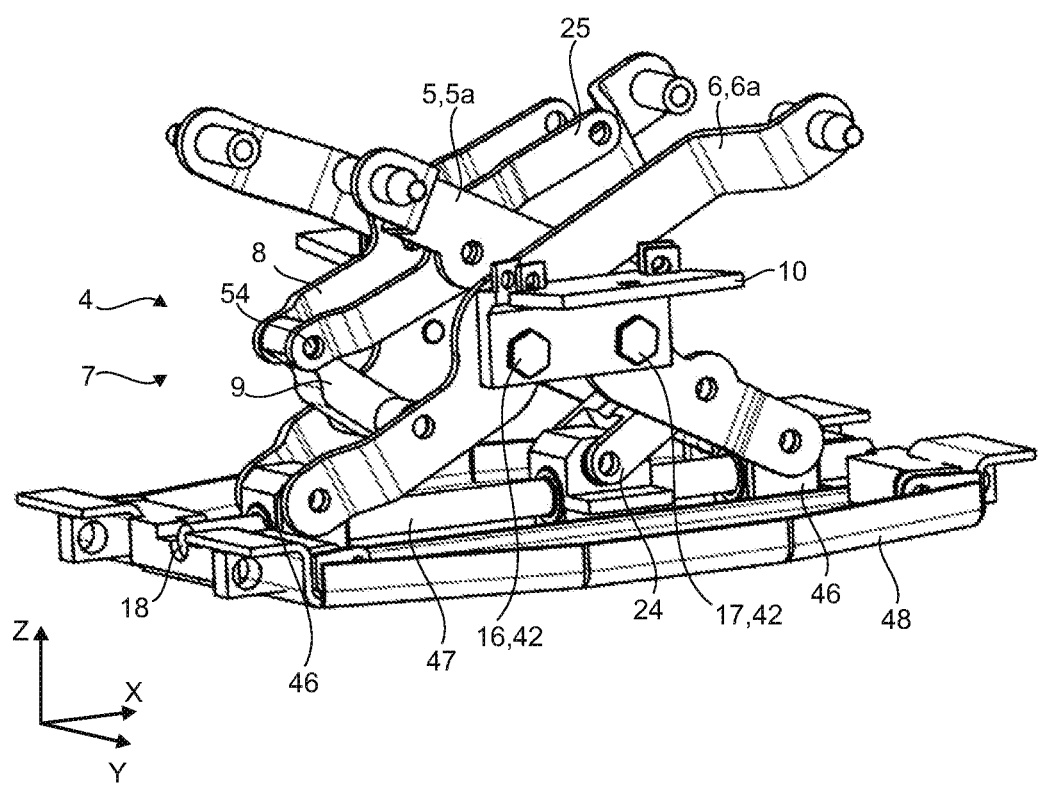
FIG. 5 is a view of the inner swinging arm pair and the outer swinging arm pair in accordance with a further embodiment.
Figure 6:
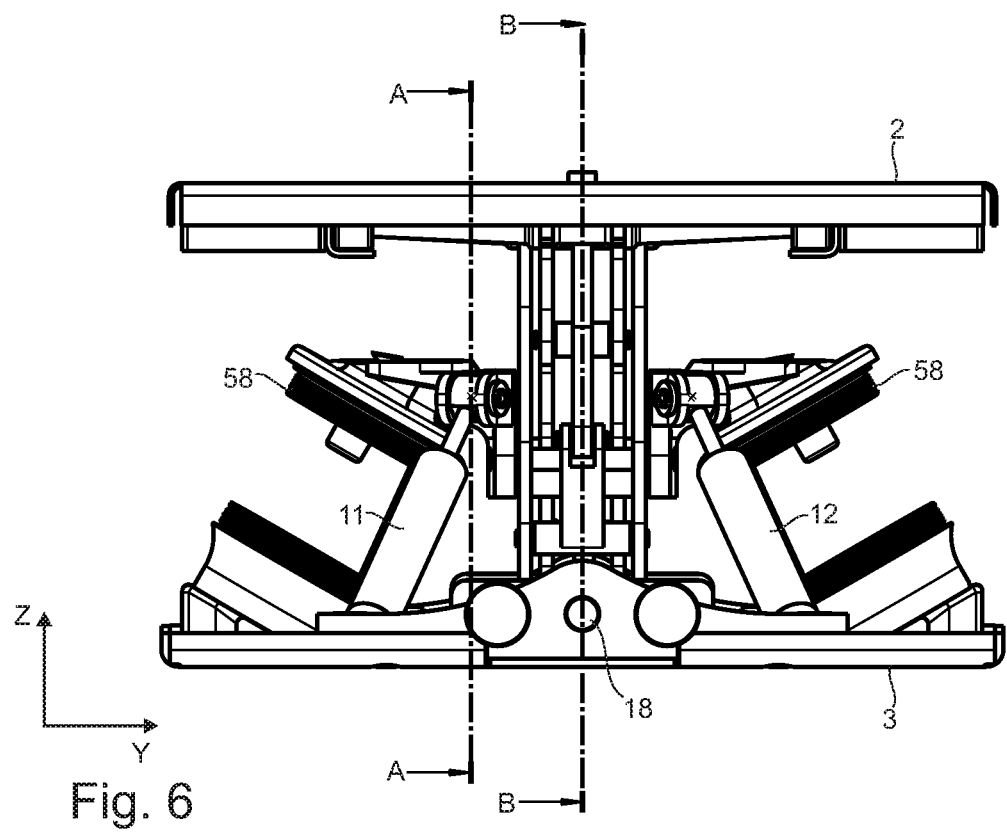
FIG. 6 is a front view of the vehicle seat in accordance with one embodiment.
Figure 7:
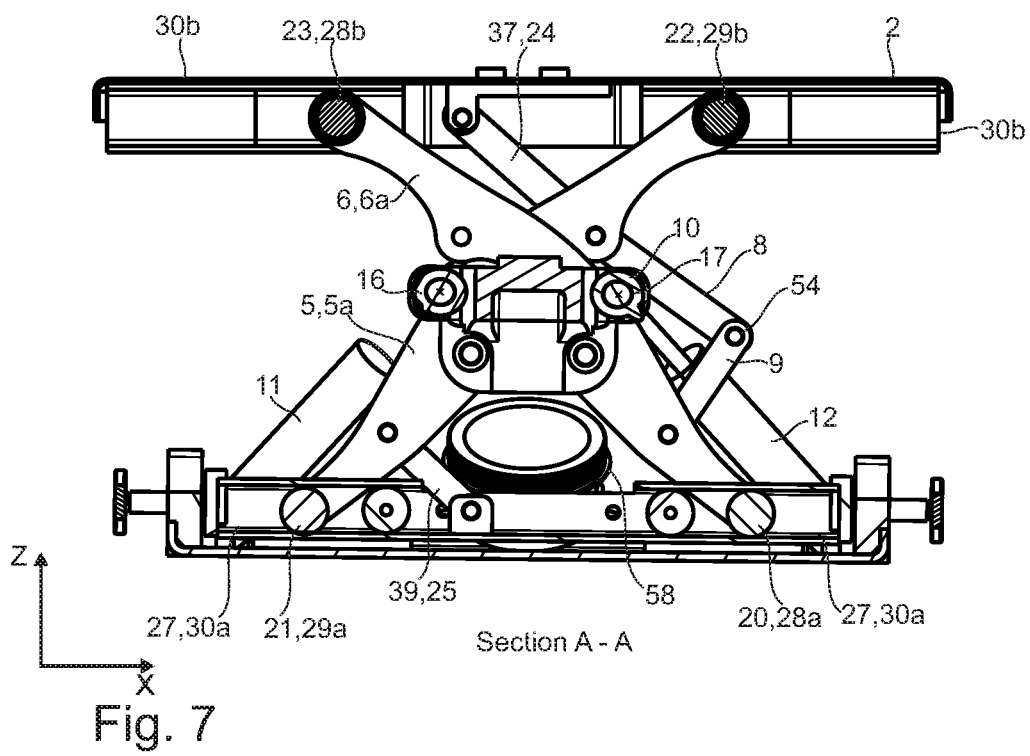
FIG. 7 is a sectional view along the axis A-A in FIG. 6.
Figure 10:
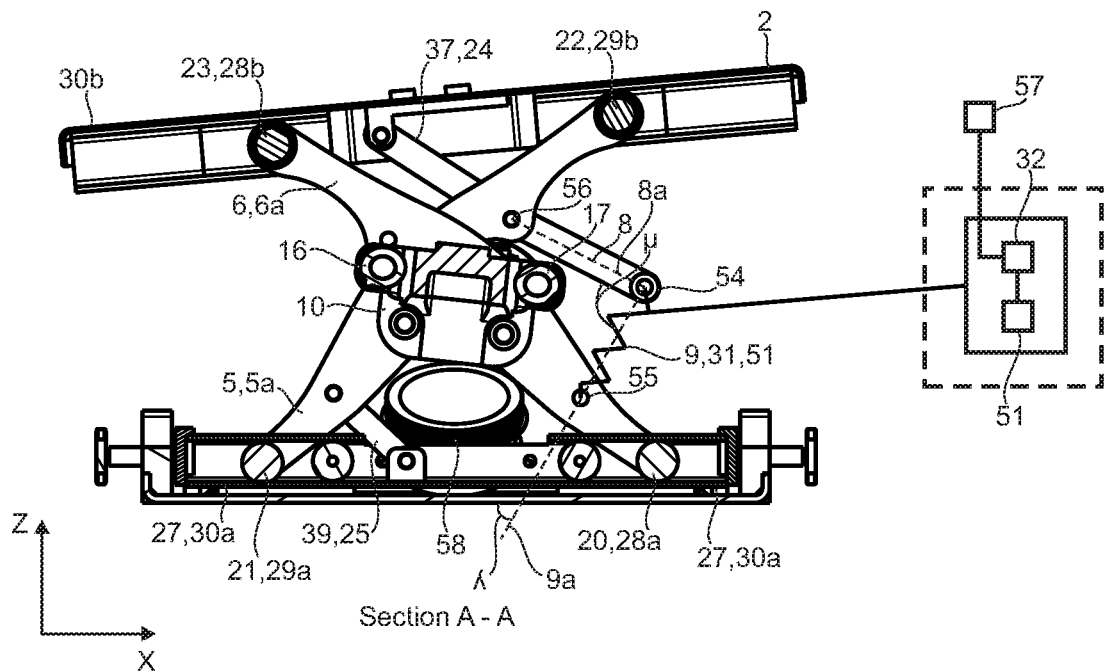
FIG. 10 is a sectional view along the axis A-A in accordance with a further embodiment.
Figure 11:
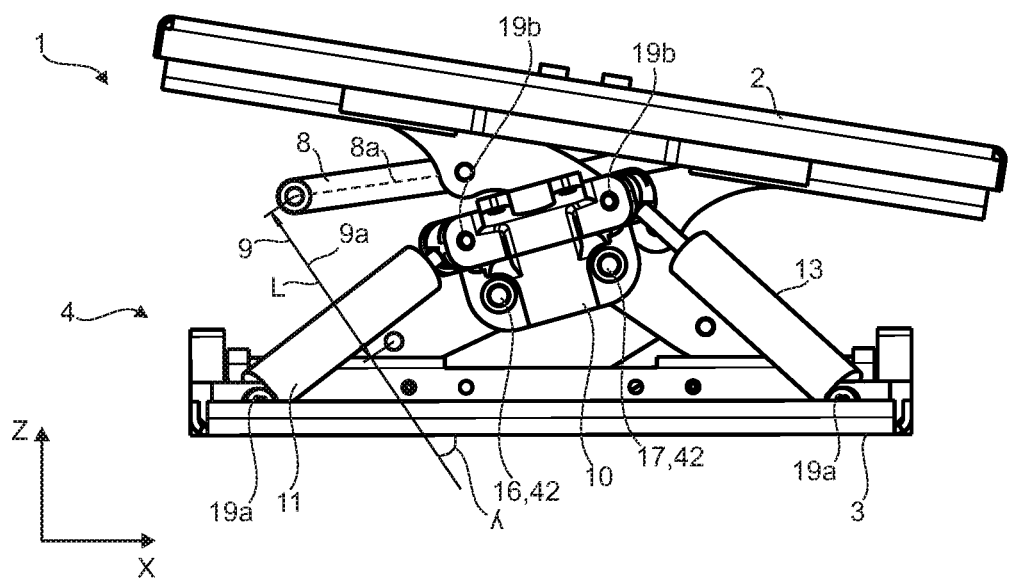
FIG. 11 is a side view of the vehicle seat in accordance with one embodiment after a pitching movement.
Figure 12:
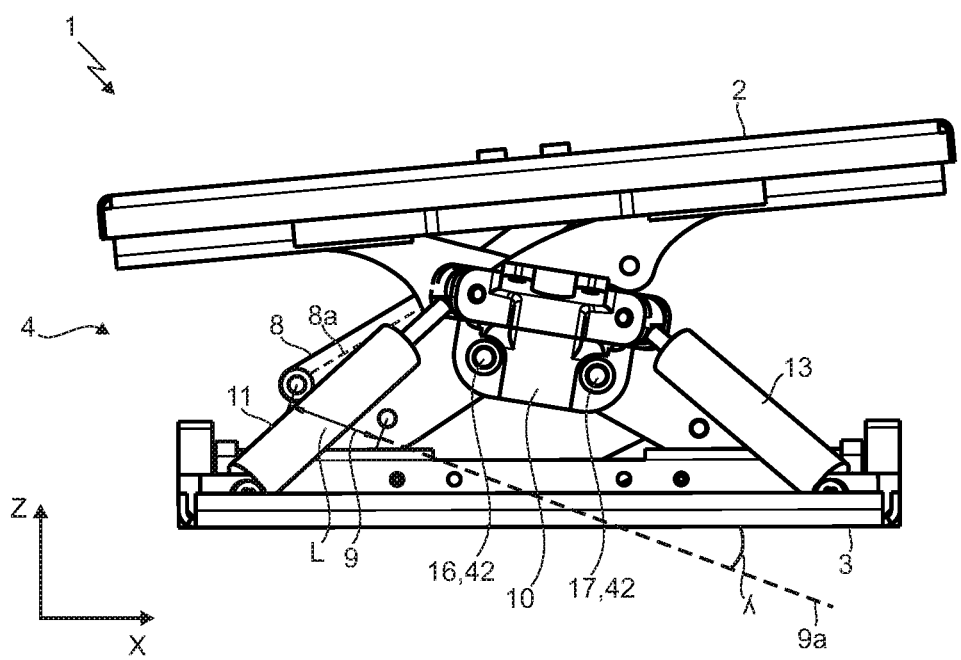
FIG. 12 is a side view of the vehicle seat in accordance with one embodiment after a pitching movement.
Figure 13:
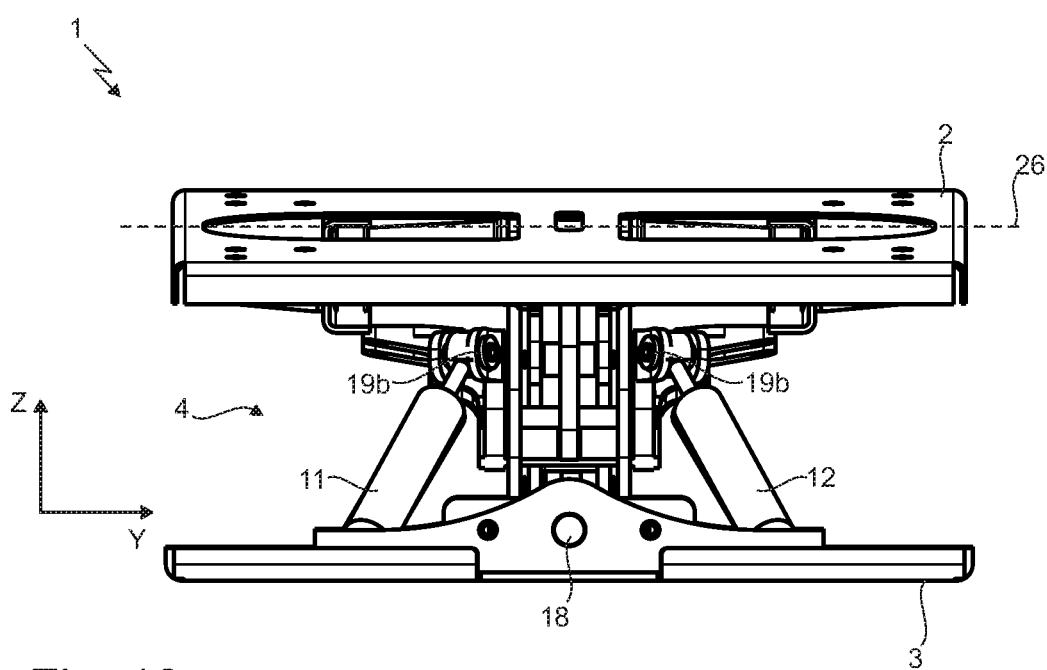
FIG. 13 is a front view of the vehicle seat in accordance with one embodiment after a pitching movement.

The scissor frame arrangement 4 comprises an inner swinging arm pair 5*a* and an outer swinging arm pair 6*a*, as shown in FIGS. 3 and 5 for example. According to the embodiment in FIG. 3, both the inner swinging arm pair 5*a* and the outer swinging arm pair 6*a* have a continuous swinging arm bolt 33, 34 at the respective swinging arm ends. The respective bearing rollers 28*a*, 28*b*, 29*a*, 29*b* are arranged on these swinging arm bolts 33, 34. This is clearly visible by way of example in FIG. 18. The inner swinging arm pair 5*a* accordingly has an upper swinging arm bolt 33*b* on which two bearing rollers 29*b* are arranged in each case, which are associated with the upper floating bearing 23 of the inner swinging arm pair 5*a*. Furthermore, the inner swinging arm pair 5*a* has a lower swinging arm bolt 33*a* on which two bearing rollers 29*a* are arranged in each case, which are associated with the lower floating bearing 21 of the inner swinging arm pair 5*a*. The outer swinging arm pair 6*a* also has accordingly an upper swinging arm bolt 34*b*, on which two bearing rollers 28*b* are arranged in each case, which are associated with the upper floating bearing 22 of the outer swinging arm pair 6*a*. Furthermore, the outer swinging arm pair 6*a* has a lower swinging arm bolt 34*a*, on which two bearing rollers 28*a* are arranged in each case, which are associated with the lower floating bearing 20 of the outer swinging arm pair 6*a*. Furthermore, the further connecting element 42, by means of which a rotatable connection between the second connecting element 10 and the at least one inner swinging arm 5 or the at least one outer swinging arm 6 is established, can be designed as a continuous bolt that extends along the respective axis of rotation 16, 17. Therefore, the second connecting element 10 would be arranged on the at least one inner swinging arm 5 or the at least one outer swinging arm 6 by means of two bolts. Furthermore, it would be conceivable that two non-continuous bolts and/or screws are provided as further connecting elements 42 for each swinging arm pair 5*a*, 6*a*. Therefore, the second connecting element 10 would be arranged on the at least one inner swinging arm 5, 5*a* and the at least one outer swinging arm 6, 6*a* by means of a total of four bolts. According to the embodiment in FIG. 5, the further connecting element 42 is designed as a bolt and/or a screw. According to the embodiment in FIG. 11, the further connecting element 42 is designed as a continuous bolt or shaft.

According to the embodiment in FIG. 5, the swinging arm pairs 5*a*, 6*a* do not have a continuous swinging arm bolt at the swinging arm ends. Rather, a bearing device for the respective bearing rollers 28*a*, 28*b*, 29*a*, 29*b* is provided at each swinging arm end which, analogously to the embodiment described in FIG. 3, are associated with the upper floating bearings 22, 23 or the lower floating bearings 20, 21.

Figures 2A, 2B:
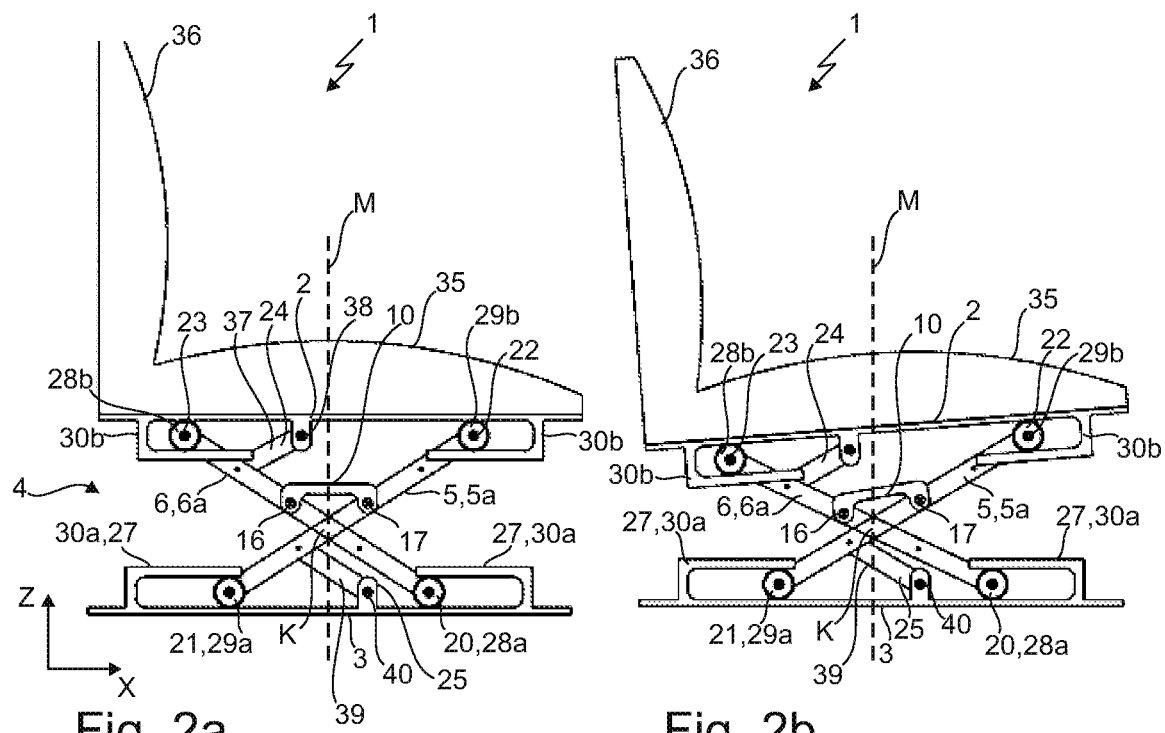
FIG. 2a, 2b are outline sketches of the vehicle seat in accordance with one embodiment.

The upper bearing rollers 28*b*, 29*b* are each guided in upper guide elements 30*b*. The lower bearing rollers 28*a*, 29*a* are each guided in lower guide elements 30*a*. In FIG. 2*a*, it can also be seen that the lower bearing rollers 28*a*, 29*a* are at a smaller distance from the central axis M than the upper bearing rollers 28*b*, 29*b* in a non-use position.

Furthermore, the at least one inner swinging arm 5, 5*a* or the at least one outer swinging arm 6, 6*a* are connected to the vehicle seat lower part 3 by means of a fixed bearing 24, the at least one inner swinging arm 5, 5*a* or the at least one outer swinging arm 6, 6*a* being connected to the vehicle seat upper part 2 by means of a further fixed bearing 25. By providing the fixed bearings 24, 25, an indefinite guidance caused by the provision of the four floating bearings 20, 21, 22, 23 is avoided.

The upper fixed bearing 24 comprises a lever arm 37 which is arranged so as to be rotatable on a rear region along the longitudinal direction X and an upper region of the at least one outer swinging arm 6, 6*a* along the height direction Z. Therefore, this lever arm 37 is arranged so as to be rotatable on the at least one outer swinging arm 6 between the upper swinging arm bolt 34*b* and the intersection point K or the connection of the connecting element 7 to the at least one outer swinging arm 6, 6*a* that is rotatable about the first axis of rotation 8. Furthermore, the lever arm 37 is arranged so as to be rotatable on the vehicle seat upper part 2. The lever arm 37 can be pivoted about a fourth axis of rotation 38 relative to the vehicle seat upper part 2. The fourth axis of rotation 38 and the first axis of rotation 16 are advantageously spaced apart from one another along the height axis Z. Furthermore, the fourth axis of rotation 38 and the first axis of rotation 16 are, at least in a non-use position, at the same distance from the central axis M.

The lower fixed bearing 25 also comprises a lever arm 39 which is arranged so as to be rotatable on a rear region along the longitudinal direction X and the lower region of the at least one inner swinging arm 5, 5a along the height direction Z. Therefore, this lever arm 39 is arranged so as to be rotatable on the at least one inner swinging arm 5 between the lower swinging arm bolt 33a and the intersection point K. Furthermore, the lever arm 39 is arranged so as to be rotatable on the vehicle seat lower part 3. The lever arm 39 can be pivoted about a fifth axis of rotation 40 relative to the vehicle seat lower part 3. The fifth axis of rotation 40 and the second axis of rotation 17 are advantageously spaced apart from one another along the height axis Z. Furthermore, the fifth axis of rotation 40 and the second axis of rotation 17 are, at least in a non-use position, at the same distance from the central axis M.

Such a configuration of the floating bearings 20, 21, 22, 23 and the fixed bearings 23, 24 ensures that the intersection point or the second connecting element 10 always remains central due to a lifting movement.

The arm element 8 is arranged on the at least one inner swinging arm 5, 5a and the first connecting element 9 on the at least one outer swinging arm 6, 6a. Of course, the arm element 8 can also be arranged on the at least one outer swinging arm 6, 6a and the first connecting element 9 can be arranged on the at least one inner swinging arm 5, 5a. An embodiment is shown in FIG. 5 in which the arm element 8 is connected to both inner swinging arms 5 of the inner swinging arm pair 5a. The first connecting element 9 is connected to both outer swinging arms 6 of the outer swinging arm pair 6a. The first connecting element 9 is rotatably connected to the arm element 8 about a sixth axis of rotation 54 and is rotatably connected to the at least one inner swinging arm 5, 5a or to the at least one outer swinging arm 6, 6a about a seventh axis of rotation 55. The arm element 8 is arranged about an eighth axis of rotation 56 on the at least one inner swinging arm 5, 5a or the at least one outer swinging arm 6, 6a. The lever arm 37 of the upper fixed bearing 24 can have a rigid connection to the arm element 8. The lever arm 37 of the upper fixed bearing 24 can also be designed in one piece or integrally with the arm element 8. This is shown for example in FIG. 8.

The arm element 8 extends along the longitudinal axis X and inclined downwards along the height axis Z. With a horizontal orientation of the vehicle seat upper part 2, the arm element 8 can preferably run substantially parallel to a swinging arm 5, 5a, 6, 6a. The arm element 8 and the connecting element 9 are arranged substantially in a triangular manner, an angle μ between the arm element 8 and the connecting element 9, or between their central axes 8a, 9a, depending on the angle of inclination ξ. The angle μ is preferably between 10° and 90°. As can be seen from FIGS. 11 and 12, in the case of an inclination change, an angle of attack λ, which extends between the connecting element 9 or a central axis 9a of the connecting element 9 and the vehicle seat lower part 3, changes. The angle of attack λ is preferably in a range between 10° and 90°.

According to an embodiment in accordance with FIGS. 5 and 8, the first connecting element 9 has a fixed length (L). Therefore, the first connecting element 9 can also be referred to as a connecting rod. The connecting rod 9 is connected to an inner, outer) swinging arm 5, 5a, 6, 6a such that it can rotate about the seventh axis of rotation 55. Furthermore, the connecting rod 9 is connected to the first arm element 8 of the mechanical coupling 7 so as to be rotatable about the sixth axis of rotation 54. Such a connecting rod 9 ensures parallel guidance between the upper suspension part 2 and the lower suspension part 3. With a constant length (L) of the connecting rod 9, the angle of inclination (ξ) is dependent on a seat height or a height of a vertical cushioning/damping.

The first connecting element 9 can, however, also be designed in such a way that the length L thereof can be modified. This is shown schematically in FIG. 10. The first connecting element 9 can comprise an actuator 31 by means of which the length L can be adjusted. Such an actuator 31 can be electrical, pneumatic or hydraulic. Furthermore, a control device 32 can be provided which controls the actuator 31. The control device 32 can be connected for signalling purposes to at least one sensor 50 which is suitable and intended to detect pitching vibrations of the vehicle seat upper part 2 and/or the vehicle seat lower part 3 and/or the body floor. Such a configuration allows for active cushioning of pitching vibrations of the vehicle seat upper part 2 and/or the vehicle seat lower part 3 and/or the body floor by controlling the actuator 31.

When the seat height is changed, the vertical distance between the vehicle seat upper part 2 and the vehicle seat lower part 3 is changed. The seat height also changes in the event of vertical vibrations, but this is dampened by the damping system. A corresponding cushioning system can also be provided, which brings about a corresponding resetting effect. With a fixed length L of the first connecting element 9, the angle of inclination ξ changes when the seat height changes. In the case of dampened, preferably cushioned, vertical vibrations, such an angle change can generally be neglected. During a seat height adjustment by the user, it is advantageous if the control device readjusts the length L of the first connecting element 9 accordingly so that the angle of inclination ξ is maintained for the newly set seat height.

According to a further advantageous embodiment, the first connecting element 9 comprises a spring element or spring/damper element 51. The spring element or spring/damper element 51 preferably allows for passive, semi-active or adaptive cushioning/damping of pitching vibrations of the vehicle seat upper part 2. The spring/damper element 51 can be designed so as to be passive, semi-active or adaptive, a semi-active configuration being provided with a control device 31 which controls the spring/damper element 51 accordingly.

During both active and semi-active control, an operating device 57 can be provided which is connected to the control device 31 for signalling purposes and by means of which an occupant can assign corresponding parameters.

The at least one inner swinging arm 5, 5a and the at least one outer swinging arm 6, 6a are arranged so as to be pivotable relative to the vehicle seat lower part 3 about a third axis of rotation 18 extending along a longitudinal direction X. The at least one inner swinging arm 5, 5a, the at least one outer swinging arm 6, 6a and the vehicle seat upper part 2 are pivoted about the third axis of rotation 18 relative to the vehicle seat lower part 3 during a rolling movement.

Furthermore, at least two damping elements 11, 12, 13, 14 are arranged between the vehicle seat upper part 2 and the vehicle seat lower part 3, said damping elements each extending, inclined at an angle of attack α, relative to a first axis 15 parallel to the height axis Z.

Four damping elements 11, 12, 13, 14 are advantageously arranged between the vehicle seat lower part 3 and the second connecting element 10. In a non-use position of the vehicle seat 1, two damping elements 11, 12, 13, 14 in each case form the legs of an imaginary trapezoid 52. The arrangement of the four damping elements 11, 12, 13, 14 can also be viewed to the effect that, together with a portion of the vehicle seat lower part 3 and the second connecting element 10, they form an imaginary truncated pyramid 53.

Figure 17:
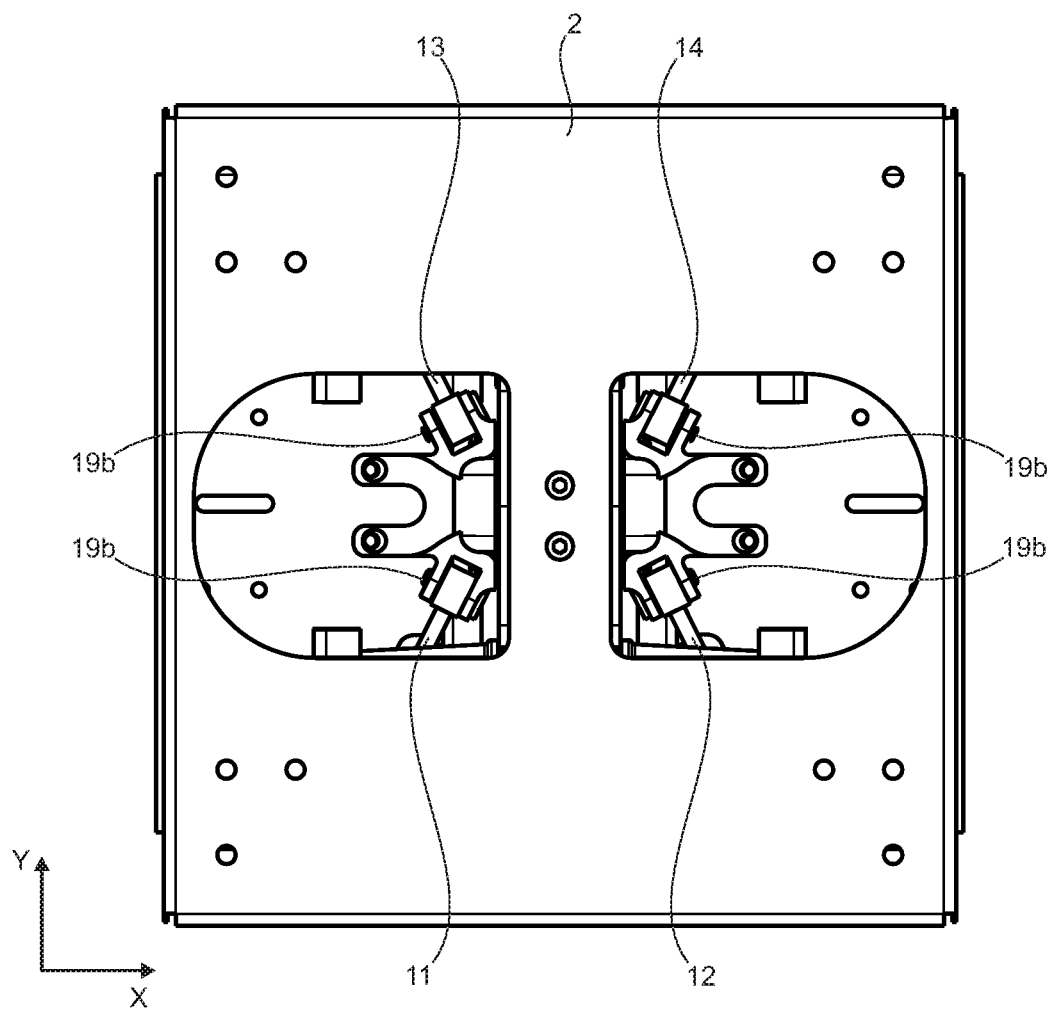
FIG. 17 is a top view of the vehicle seat in accordance with one embodiment.

The damping elements 11, 12, 13, 14 are arranged on the vehicle seat lower part 3 so as to be pivotable about a respective pivot axis 19a, which damping elements are clearly visible by way of example in FIG. 17. Furthermore, the damping elements 11, 12, 13, 14 are arranged on the second connecting element 10 so as to be pivotable about a further respective pivot axis 19b. For this purpose, the second connecting element 10 has corresponding receptacles 43, on which the damping elements 11, 12, 13, 14 can be arranged so as to be pivotable. This is clearly visible in FIGS. 4a and 4b. Corresponding receptacles 45 are also provided on the vehicle seat lower part 3, on which the damping elements 11, 12, 13, 14 can be arranged so as to be pivotable.

Figure 15B:
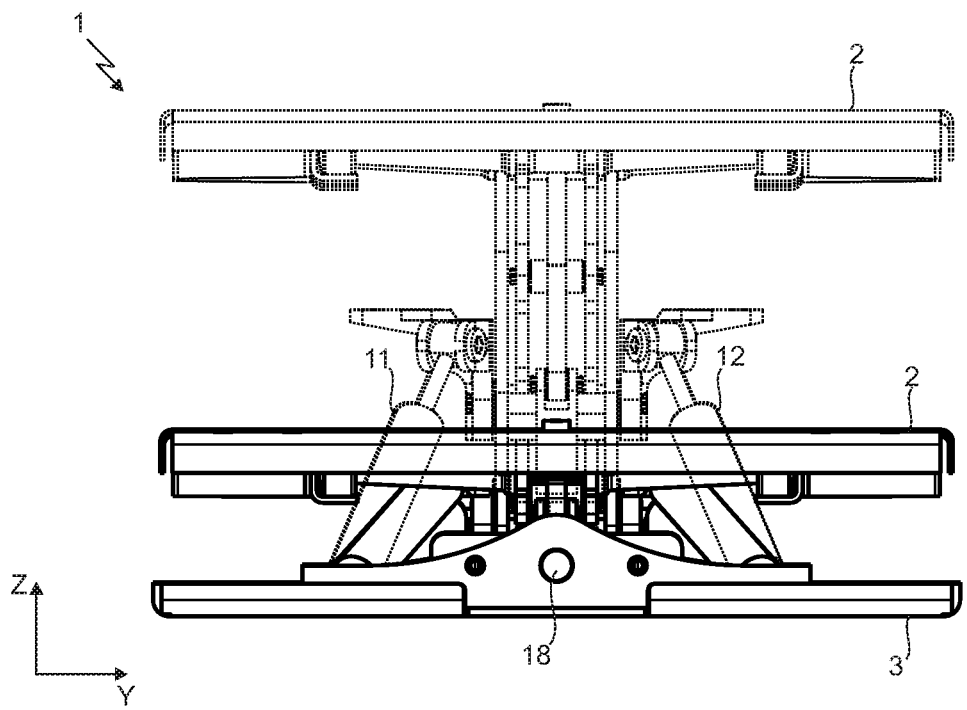
FIG. 15b is a front view of the vehicle seat in accordance with one embodiment in an upper and a lower position along the height axis Z.
Figure 16A:
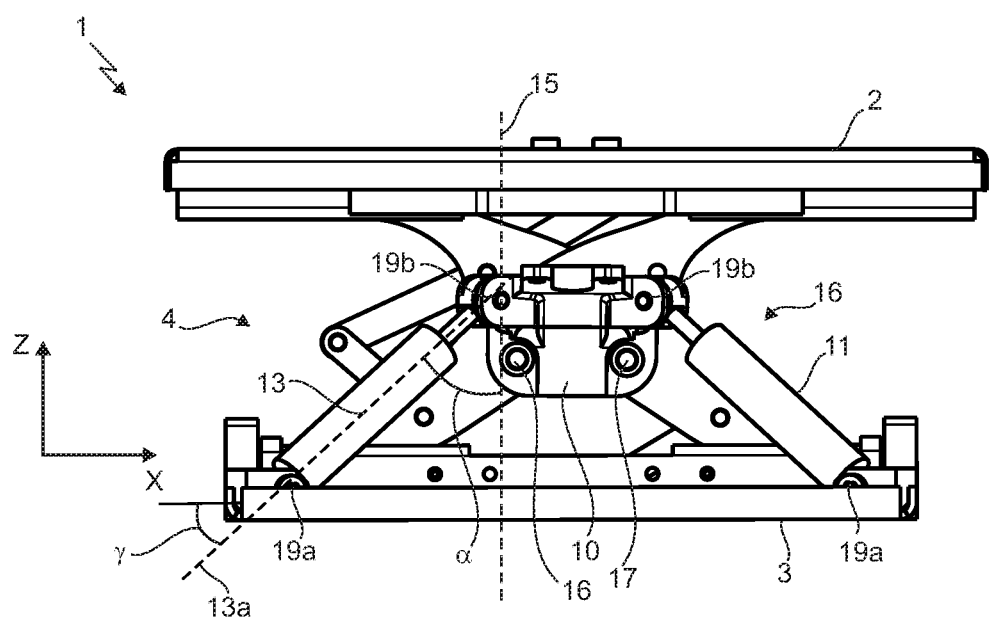
FIG. 16a is a side view of the vehicle seat in accordance with one embodiment in a central position along the height axis Z.
Figure 16B:
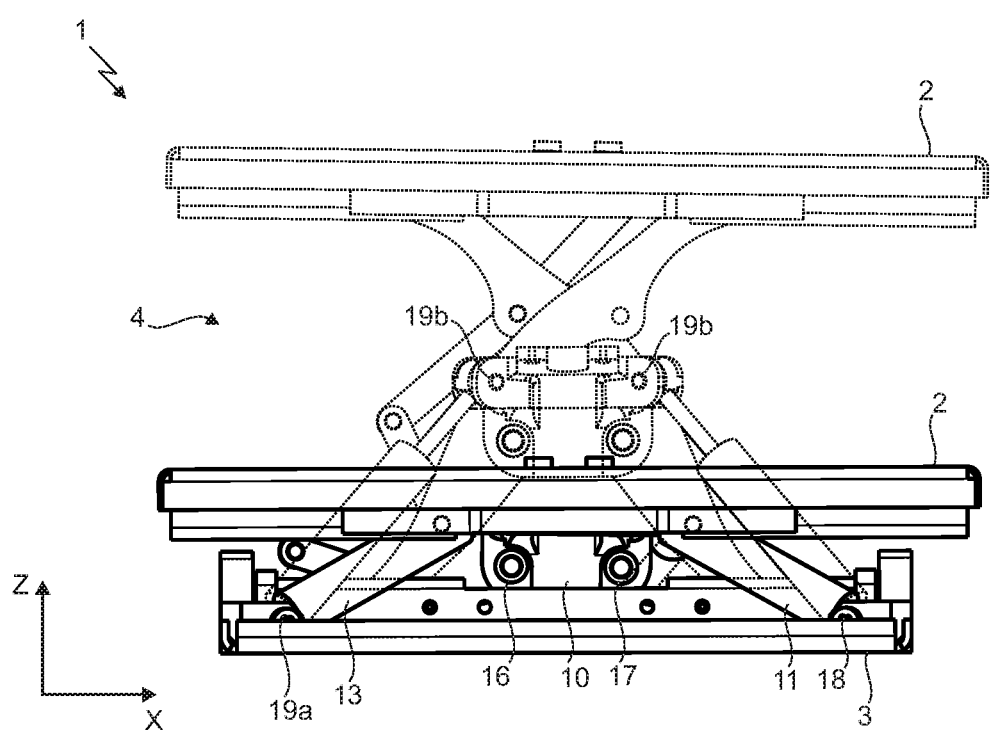
FIG. 16b is a side view of the vehicle seat in accordance with one embodiment in an upper and a lower position along the height axis Z.

During a vertical movement of the vehicle seat upper part 2 relative to the vehicle seat lower part 3, the second connecting element 10 is displaced along the height axis Z; accordingly, all four damping elements 11, 12, 13, 14 are modified in length. Furthermore, with such a vertical movement of the vehicle seat upper part 2 by the pivotable arrangement of the damping elements 11, 12, 13, 14, the angle of attack α of the damping elements 11, 12, 13, 14 is modified accordingly. The angle of attack α extends between a central axis 11a, 12a, 13a, 14a of the respective damping element 11, 12, 13, 14 and the first axis 15. Accordingly, the vertical movement of the vehicle seat upper part 2 is dampened by the damping elements 11, 12, 13, 14. This is clearly visible in FIGS. 15 and 16. FIGS. 15a and 16a show a state in which the vehicle seat is in a central vertical position. Furthermore, a vehicle seat 1 is shown in FIGS. 15b and 16b, which is in an upper (represented as a dashed line) or in a lower vertical position.

In FIGS. 2b, 9 to 13 and 19, a vehicle seat 1 is shown in which the vehicle seat upper part 2 has experienced a pitching movement relative to the vehicle seat lower part 3. During such a pitching movement, the vehicle seat upper part 2 is tilted about a pitch axis 26 relative to the vehicle seat lower part 3. The tilting can be expressed in the angle of inclination ξ. In the process, a displacement of the swinging arm ends mounted in the upper floating bearings 22, 23 takes place on different horizontal planes along the height axis Z. In addition, the second connecting element 10 is rotated about the first axis of rotation 16 and the second axis of rotation 17. By this rotation of the second connecting element 10, the damping elements 11, 12, 13, 14 are lengthened or shortened in accordance with the direction of rotation. The pitching movement is thus dampened. As can be seen from the drawings, it is advantageous that the connecting element is tilted and/or rotated in the counter direction relative to the vehicle seat upper part 2. Analogously to this, a pitching movement can also take place in such a way that the vehicle seat upper part 2 retains its horizontal position and the vehicle seat lower part 3 tilts accordingly. Accordingly, the displacement of the axes of the lower floating bearings 20, 21 takes place into other horizontal planes. Analogously, the second connecting element 10 is also rotated about the first axis of rotation 16 and the second axis of rotation 17 in this case. By this rotation of the second connecting element 10, the damping elements 11, 12, 13, 14 are lengthened or shortened in accordance with the direction of rotation. The pitching movement is thus dampened.

In addition to damping the vertical movement of the vehicle seat upper part 2 and the pitching movement, a rolling movement can also be dampened by means of the damping elements 11, 12, 13, 14. For this purpose, the at least one inner swinging arm 5, 5a, the at least one outer swinging arm 6, 6a and the vehicle seat upper part 2 can be pivoted relative to the vehicle seat lower part 3 about a third axis of rotation 18 extending along the longitudinal direction X. Such a rolling movement is shown in FIG. 14. As a result of the pivoting about the third axis of rotation 18, the orientation of the vehicle seat upper part 2 changes relative to the vehicle seat lower part 3. The vehicle seat upper part 2 and the vehicle seat lower part 3 each extend in a starting position in one plane. The plane in which the vehicle seat upper part 2 extends can be described by the vectors A1 and A2. The plane in which the vehicle seat lower part 3 extends can be described by the vectors A3 and A4. In a starting position in which the vehicle seat upper part 2 and the vehicle seat lower part 3 are arranged parallel to one another, the vectors A2 and A4 would be arranged parallel to the width axis Y and the vectors A1 and A3 would arranged be parallel to the longitudinal axis X. In the event of a rolling movement, the vectors A2 and A4 have an angle θ≠0°, 180°. This is shown, for example, in FIG. 11, the vectors A1 and A3 being directed into the plane of the drawing. In the event of a rolling movement, a distance changes between the pivot axis 19b with respect to an upper connection of a damper element 11, 12, 13, 14 to the second connecting element 10 and between the pivot axis 19a with respect to a lower connection of a damper element 11, 12, 13, 14 to the vehicle seat lower part 3. Therefore, the damper elements 11, 12, 13, 14 are shortened or lengthened accordingly, as a result of which the rolling movement is dampened.

Figure 18:
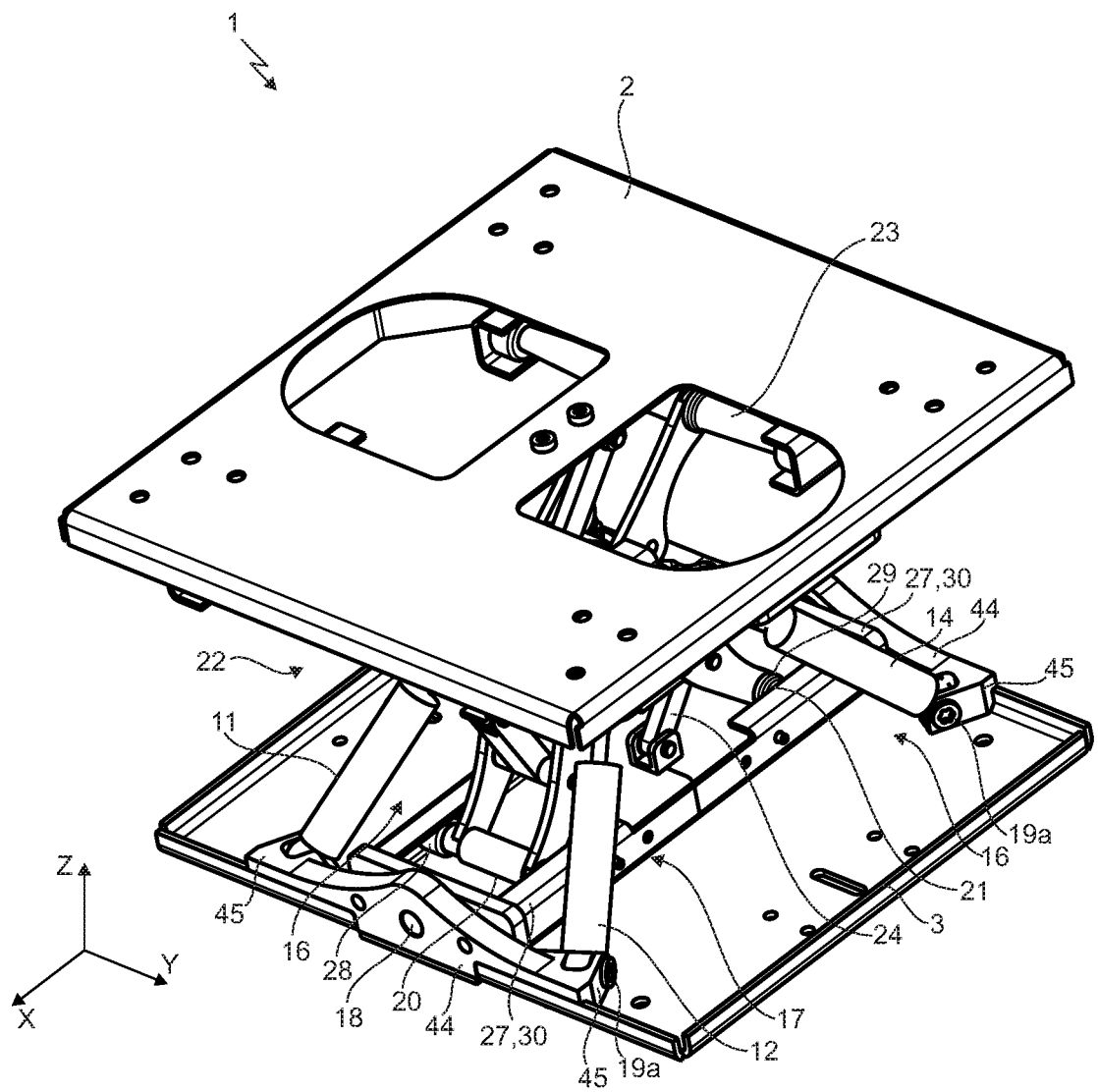
FIG. 18 is an isometric view of the vehicle seat in accordance with one embodiment.
Figure 19:
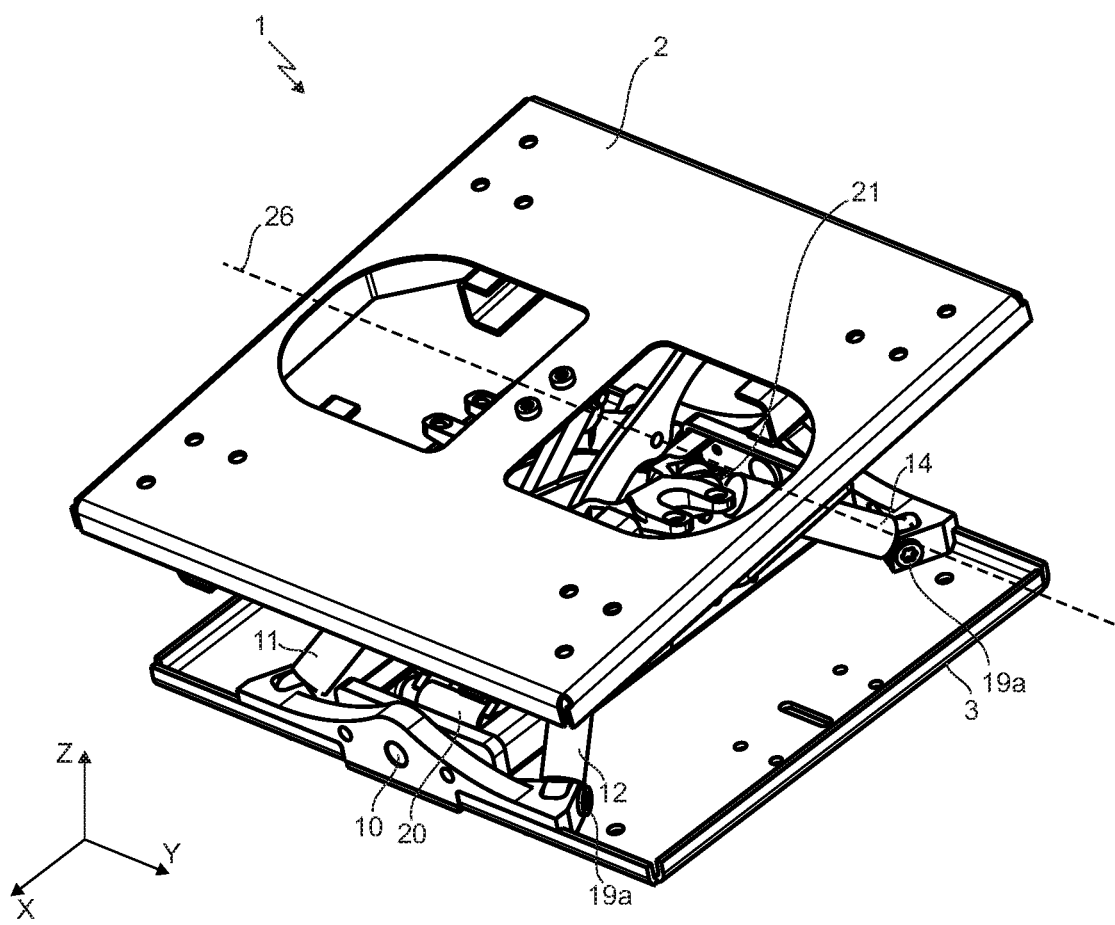
FIG. 19 is an isometric view of the vehicle seat in accordance with one embodiment after a pitching movement.

The lower floating bearings 20, 21 of the at least one inner swinging arm 5, 5a and the at least one outer swinging arm 6, 6a comprise at least one receiving element 27 which is pivotable about the third axis of rotation 18 relative to the vehicle seat lower part 3. FIG. 18 shows an embodiment in which the receiving element 27 and guide element 30a is formed in which the lower bearing rollers 28a, 29a are guided. The guide element is designed as a substantially plate-like element which extends along the longitudinal extent of the vehicle seat lower part 3 and is arranged substantially centrally thereon. The vehicle seat lower part 3 has a fastening element 44 on each of its two longitudinal sides. On this fastening element 44, the guide element 30a is mounted so as to be rotatable about the third axis of rotation 18, in each case by means of a rotary bearing. The receptacles 45, on which the damping elements 11, 12, 13, 14 are arranged so as to be pivotable, are also arranged laterally on the fastening element 44 or are integrated therein. The lower fixed bearing 25 is also arranged on the plate-like element.

According to the embodiment in accordance with FIG. 5, no lower bearing rollers 28a, 29a are provided. The at least one inner swinging arm 5, 5a and the at least one outer swinging arm 6, 6a are connected in each case to a sliding element 46, which can slide along the longitudinal direction X on a continuous sliding rail 47. The sliding rail 47 is connected to the holding element 48 and extends along the third axis of rotation 18. In the event of a rolling movement, the sliding elements 46 can be rotated about the third axis of rotation 18 and/or the fixed sliding rail 47. The lower fixed bearing 25 is also connected to the sliding rail 47. In a further embodiment (not shown in this case), the sliding rail is designed as a torque-transmitting square shaft. This square shaft is then mounted so as to be rotatable on the holding element 48 and/or the receptacles thereof. In this embodiment, it then applies that the sliding elements 46 execute the x movement on the sliding rail 47 and the rolling movement is realised by rotating the sliding rail 47.

In FIG. 15a, the front view of the vehicle seat 1 is shown. A projected angle of attack β is also shown. The projected angle of attack β in the plane of the front view mainly determines the division of the damper forces into the components about a roll axis or about the third axis of rotation 18 and in the vertical direction. A side view of the vehicle seat 1 is shown in FIG. 16a.

Furthermore, a projected angle of attack γ is shown. The projected angle of attack γ in the plane of the side view mainly determines the division of the damper forces into the components about the pitch axis and in the vertical direction. Therefore, it can be seen that the damper forces of the damping elements 11, 12, 13, 14 are divided into the respective components with regard to a rolling movement, a pitching movement and a vertical movement, depending on the angle of attack α.

In order to allow a corresponding resetting of the pitching movement, the rolling movement and the vertical movement, spring element 49 can be arranged parallel to the damping elements 11, 12, 13, 14 between the connecting element 7 and the vehicle seat lower part 3. The arrangement and the function of the spring elements 49 can be described analogously to the damper elements 11, 12, 13, 14 with the difference that a resetting operation is effected instead of the dissipative function. In FIGS. 6 to 10, receptacles 58 for these spring elements 49 are shown, which spring elements can also be arranged so as to be inclined relative to the first axis 15. FIG. 1 shows the spring element 49 which are arranged so as to be inclined.

All features disclosed in the application documents are claimed as being substantial to the invention, provided that they are, individually or in combination, novel over the prior art.

LIST OF REFERENCE SIGNS 1 vehicle seat
2 vehicle seat upper part
3 vehicle seat lower part
4 scissor frame arrangement
5 at least one inner swinging arm
5a inner swinging arm pair
6 at least one outer swinging arm
6a outer swinging arm pair
7 mechanical coupling
8 arm element
8a central axis of the arm element
9 first connecting element
9a central axis of the first connecting element
10 second connecting element
11 damping element
11a central axis of the damping element
12 damping element
12a central axis of the damping element
13 damping element
13a central axis of the damping element
14 damping element
14a central axis of the damping element
15 first axis
16 first axis of rotation
17 second axis of rotation
18 third axis of rotation
19a pivot axis
19b pivot axis
20 lower floating bearing of the outer swinging arm pair
21 lower floating bearing of the inner swinging arm pair
22 upper floating bearing of the outer swinging arm pair
23 upper floating bearing of the inner swinging arm pair
24 upper fixed bearing
25 lower fixed bearing
26 pitch axis
27 receiving element
28a lower bearing rollers
28b upper bearing rollers
29a lower bearing rollers
29b upper bearing rollers
30a lower guide element
30b upper guide element
31 actuator
32 control device
33a lower swinging arm bolt
33b upper swinging arm bolt
34a upper swinging arm bolt
34b lower swinging arm bolt
35 seat cushion
36 backrest
37 lever arm
38 fourth axis of rotation
39 lever arm
40 fifth axis of rotation
41 central bearing bores
42 further connecting element
43 receptacles of the connecting element
44 fastening element
45 receptacles
46 sliding element
47 sliding rail
48 holding element
49 spring element
50 sensor
51 spring/damper element
52 imaginary trapezoid
53 imaginary truncated pyramid
54 sixth axis of rotation
55 seventh axis of rotation
56 eighth axis of rotation
57 operating device
58 receptacle
A1 vector
A2 vector
A3 vector
A4 vector
K intersection region
L length of the first connecting element
M central axis
Z height axis
X longitudinal axis
Y width axis
α angle of attack
β angle
γ angle
θ angle
ξ angle of inclination
μ angle
λ angle

What is claimed is:

1. A vehicle seat, comprising:
a vehicle seat upper part; and
a vehicle seat lower part, wherein the vehicle seat upper part and the vehicle seat lower part are spaced apart from one another along a height axis and are connected to one another by means of a scissor frame arrangement, wherein the scissor frame arrangement comprises at least one inner swinging arm and at least one outer swinging arm, wherein the at least one inner swinging arm and the at least one outer swinging arm are mechanically coupled, whereby an angle of inclination of the vehicle seat upper part relative to the vehicle seat lower part is selectable, wherein the mechanical coupling comprises an arm element and a first connecting element pivotably connected thereto, wherein the angle of inclination is specified by a length of the first connecting element, wherein the arm element is arranged on the at least one inner swinging arm and the first connecting element is arranged on the at least one outer swinging arm, or the arm element is arranged on the at least one outer swinging arm and the first connecting element is arranged on the at least one inner swinging arm, wherein the arm element is rotatably arranged on the at least one inner swinging arm or the at least one outer swinging arm, and wherein the first connecting element is rotatably arranged on the at least one inner swinging arm or the at least one outer swinging arm.

2. A vehicle seat, comprising:
a vehicle seat upper part; and
a vehicle seat lower part, wherein the vehicle seat upper part and the vehicle seat lower part are spaced apart from one another along a height axis and are connected to one another by means of a scissor frame arrangement, wherein the scissor frame arrangement comprises at least one inner swinging arm and at least one outer swinging arm, wherein the at least one inner swinging arm and the at least one outer swinging arm are mechanically coupled, whereby an angle of inclination of the vehicle seat upper part relative to the vehicle seat lower part is selectable, wherein the mechanical coupling comprises an arm element and a first connecting element pivotably connected thereto, wherein the angle of inclination is specified by a length of the first connecting element, wherein the at least one inner swinging arm and the at least one outer swinging arm are connected by a second connecting element which can be rotated about an axis of rotation extending along a width direction relative to the at least one inner swinging arm and relative to the at least one outer swinging arm, the at least one inner swinging arm and the at least one outer swinging arm intersecting in an intersection region, a first axis of rotation and a second axis of rotation being arranged, at least in a non-use position, along the height axis above the intersection region or along the height axis below the intersection region, the first axis of rotation and the second axis of rotation having a predetermined distance, at least in a non-use position, along the height axis to the vehicle seat lower part, the vehicle seat upper part being tilted about a pitch axis relative to the vehicle seat lower part in the event of a pitching movement, the second connecting element being rotated about the first axis of rotation and about the second axis of rotation during this pitching movement.

3. A vehicle seat, comprising:
a vehicle seat upper part; and
a vehicle seat lower part, wherein the vehicle seat upper part and the vehicle seat lower part are spaced apart from one another along a height axis and are connected to one another by means of a scissor frame arrangement, wherein the scissor frame arrangement comprises at least one inner swinging arm and at least one outer swinging arm, wherein the at least one inner swinging arm and the at least one outer swinging arm are mechanically coupled, whereby an angle of inclination of the vehicle seat upper part relative to the vehicle seat lower part is selectable, wherein the mechanical coupling comprises an arm element and a first connecting element pivotably connected thereto, wherein the angle of inclination is specified by a length of the first connecting element, wherein the at least one inner swinging arm and the at least one outer swinging arm are each arranged on the vehicle seat lower part by means of at least one lower floating bearing, the at least one inner swinging arm and the at least one outer swinging arm each being arranged on the vehicle seat upper part by means of at least one upper floating bearing, the at least one inner swinging arm or the at least one outer swinging arm being connected to the vehicle seat lower part by means of a fixed bearing, the at least one inner swinging arm or the at least one outer swinging arm being connected to the vehicle seat upper part by means of a further fixed bearing.

4. The vehicle seat according to claim 1, wherein the first connecting element has a fixed length.

5. The vehicle seat according to claim 1, wherein the first connecting element is an actuator, wherein a control device is provided which controls the actuator, at least one sensor being provided, which is suitable and intended to detect pitching vibrations of the vehicle seat upper part, active cushioning of pitching vibrations of the vehicle seat upper part taking place by controlling the actuator.

6. The vehicle seat according to claim 1, wherein the first connecting element comprises a spring element or a spring/damper element, whereby a passive or a semi-active cushioning/damping of pitching vibrations of the vehicle seat upper part is made possible.

7. The vehicle seat according to claim 2, wherein the at least one inner swinging arm and the at least one outer swinging arm are arranged so as to be pivotable relative to the vehicle seat lower part about a third axis of rotation extending along a longitudinal direction, the at least one inner swinging arm, the at least one outer swinging arm and the vehicle seat upper part being pivoted about the third axis of rotation relative to the vehicle seat lower part during a rolling movement.

8. The vehicle seat according to claim 2, wherein at least two damping elements are arranged between the vehicle seat upper part and the vehicle seat lower part, each damping element extending, inclined at an angle of attack $\alpha$, relative to a first axis parallel to the height axis, four damping elements being arranged between the vehicle seat lower part and the second connecting element, two damping elements in each case forming legs of an imaginary trapezoid in a non-use position of the vehicle seat.

9. The vehicle seat according to claim 8, wherein during a vertical movement of the vehicle seat upper part relative to the vehicle seat lower part, the second connecting element is displaced along the height axis , the angle of attack $\alpha$ of the damping elements being dependent on a vertical position of the vehicle seat upper part relative to the vehicle seat lower part , the angle of attack $\alpha$ extending between a central axis of the respective damping element and the first axis and being selected from a range between 10° and 80°.

10. The vehicle seat according to claim 3, wherein the lower floating bearings of the at least one inner swinging arm and the at least one outer swinging arm comprise at least one receiving element, the at least one receiving element being pivotable about a third axis of rotation relative to the vehicle seat lower part, the lower floating bearings comprising bearing rollers, the at least one receiving element being formed as a guide element, in which bearing rollers are guided along a longitudinal direction.

* * * * *